United States Patent
Amirian et al.

(10) Patent No.: US 8,146,887 B1
(45) Date of Patent: Apr. 3, 2012

(54) DAMPER MECHANISM

(76) Inventors: Hayghaz Amirian, Glendale, CA (US);
Saro Vahe Amirian, Glendlae, CA (US);
Sevak Stepan Amirian, Sherman Oaks, CA (US)

( * ) Notice: Subject to any disclaimer, the term of this patent is extended or adjusted under 35 U.S.C. 154(b) by 402 days.

(21) Appl. No.: 12/547,845

(22) Filed: Aug. 26, 2009

Related U.S. Application Data

(60) Provisional application No. 61/201,655, filed on Dec. 12, 2008.

(51) Int. Cl.
*F16K 1/226* (2006.01)

(52) U.S. Cl. .......................... 251/306; 251/357

(58) Field of Classification Search .......... 251/305–308, 251/357
See application file for complete search history.

(56) References Cited

U.S. PATENT DOCUMENTS

| | | | |
|---|---|---|---|
| 1,422,868 A | 7/1922 | Kasch et al. | |
| 1,517,335 A | 12/1924 | Zinis | |
| 2,835,467 A | 5/1958 | Guidford | |
| 2,980,388 A * | 4/1961 | White | 251/175 |
| 3,295,821 A | 1/1967 | McQuown | |
| 3,905,577 A * | 9/1975 | Karpenko | 251/357 |
| 4,082,246 A * | 4/1978 | Rothwell | 251/307 |
| 4,154,426 A * | 5/1979 | Santy et al. | 251/306 |
| 4,253,641 A * | 3/1981 | VanRyck | 251/306 |
| 4,492,361 A * | 1/1985 | Jacquet et al. | 251/356 |
| 4,674,528 A | 6/1987 | Nishio et al. | |
| 4,691,689 A | 9/1987 | Shepherd et al. | |
| 4,766,807 A | 8/1988 | Davis | |
| 4,917,350 A | 4/1990 | Beyer et al. | |
| 5,035,214 A * | 7/1991 | Daly et al. | 251/357 |
| 5,275,375 A * | 1/1994 | Semence | 251/308 |
| 5,318,104 A | 6/1994 | Shah et al. | |
| 5,788,218 A | 8/1998 | Goldman | |
| 5,863,246 A | 1/1999 | Bujak, Jr. et al. | |
| 5,899,805 A | 5/1999 | Dowd et al. | |
| 5,921,277 A | 7/1999 | Bernal | |
| 5,944,098 A | 8/1999 | Jackson | |
| 6,244,567 B1 * | 6/2001 | Robbins | 251/306 |
| 6,435,211 B2 | 8/2002 | Stone et al. | |

OTHER PUBLICATIONS

Jeffy Dampers by Windgate Products Co., Inc.; http://www.windgateproducts.com/jiffy_damper.html.
Manual Volume Dampers by Windgate Products Co., Inc.; http://www.windgateproducts.com/manual_volume_dampers.html.
Fully assembled sleeve by Windgate Products Co., Inc.; http://www.windgateproducts.com/fully_assembled_sleeves.html.

* cited by examiner

*Primary Examiner* — John Bastianelli
(74) *Attorney, Agent, or Firm* — Patent Law Agency, LLC; Peter Ganjian

(57) ABSTRACT

A damper mechanism comprising a single piece damper blade and a damper seal. The damper blade having a tie-down tab pair, with the tie-down tab pair positioned along a periphery edge of the damper blade for coupling a damper seal with the damper blade. The damper seal is comprised of a set of apertures for insertion of the tie-down tab pair for locking the damper seal with the damper blade.

10 Claims, 32 Drawing Sheets

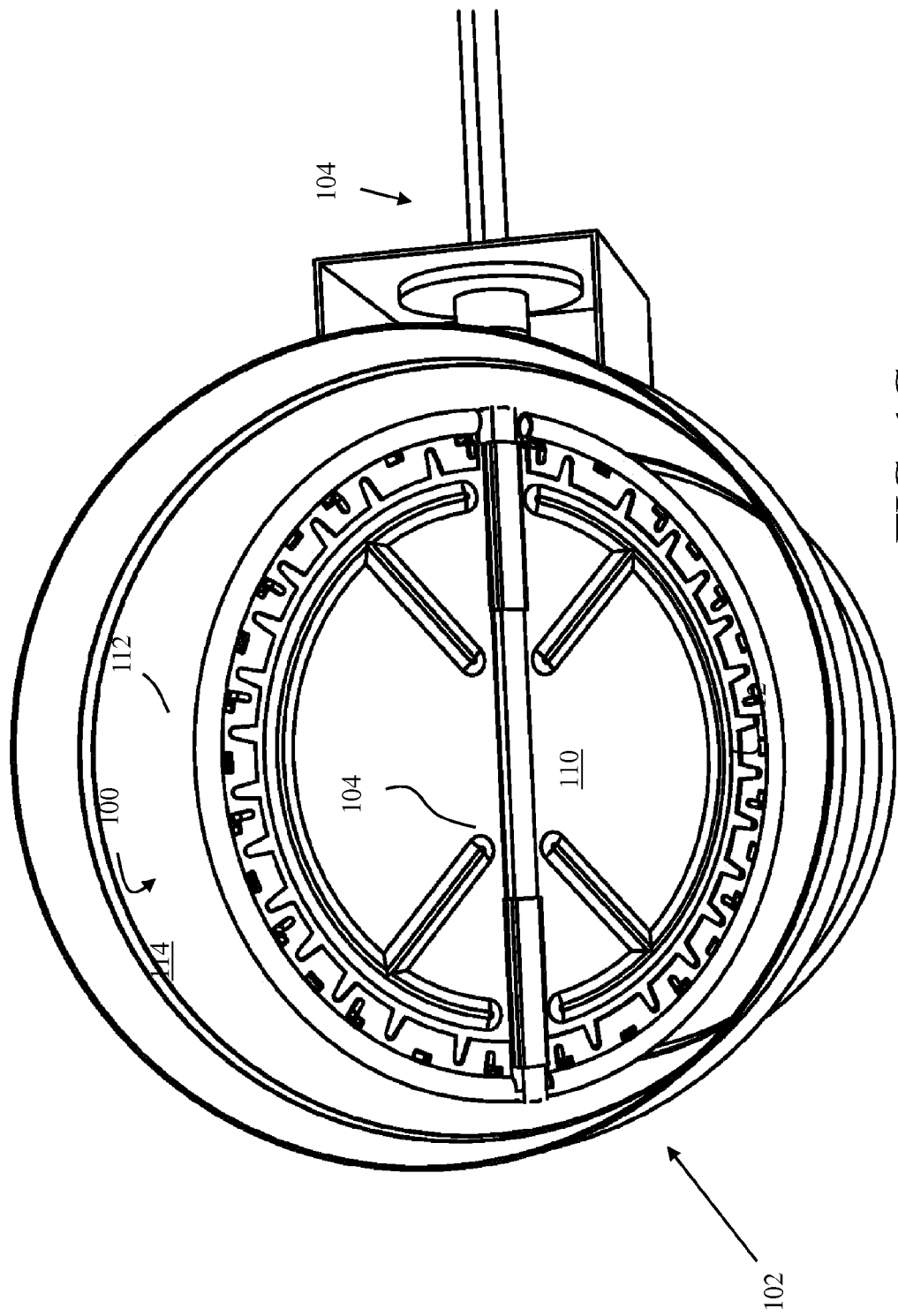

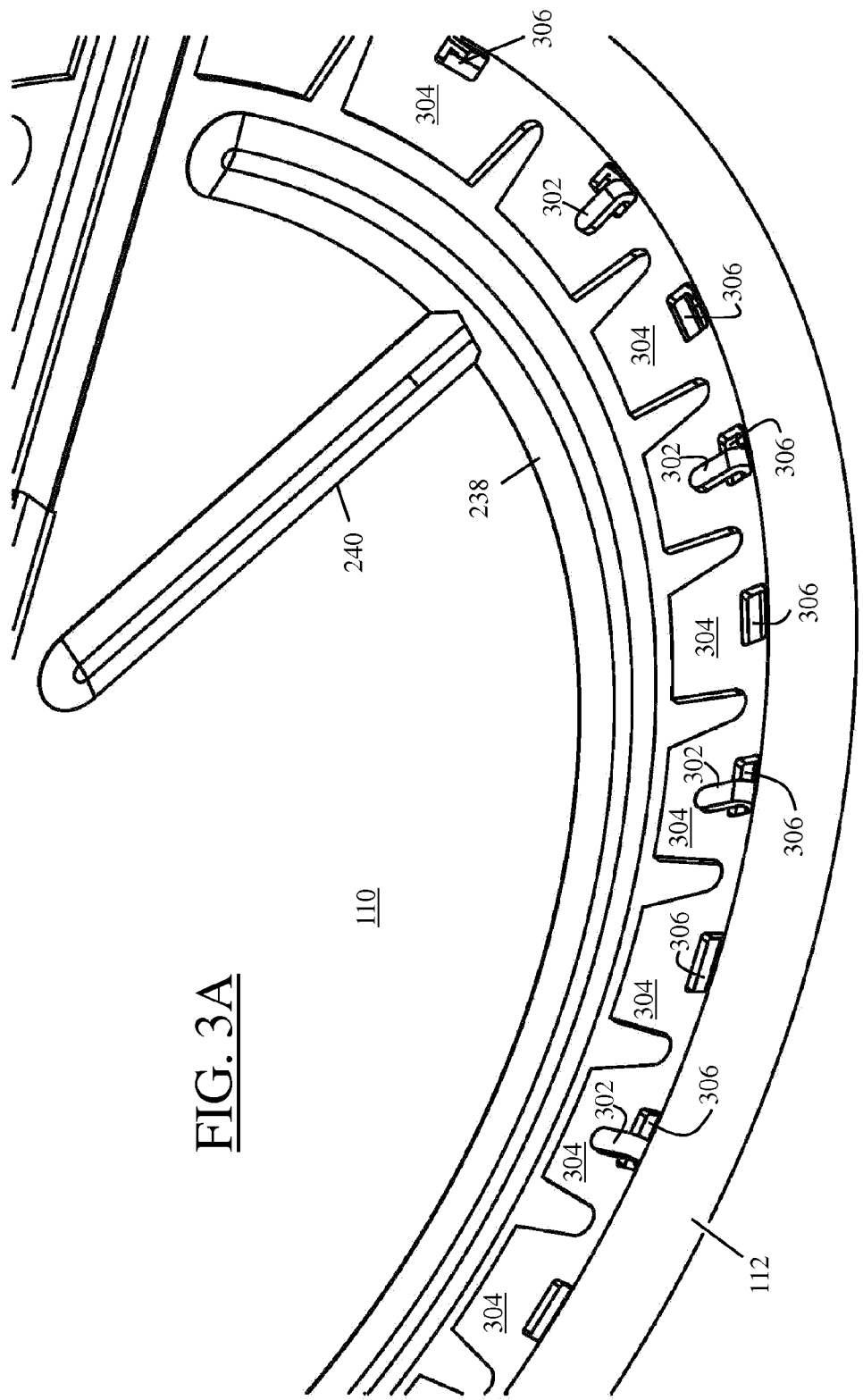

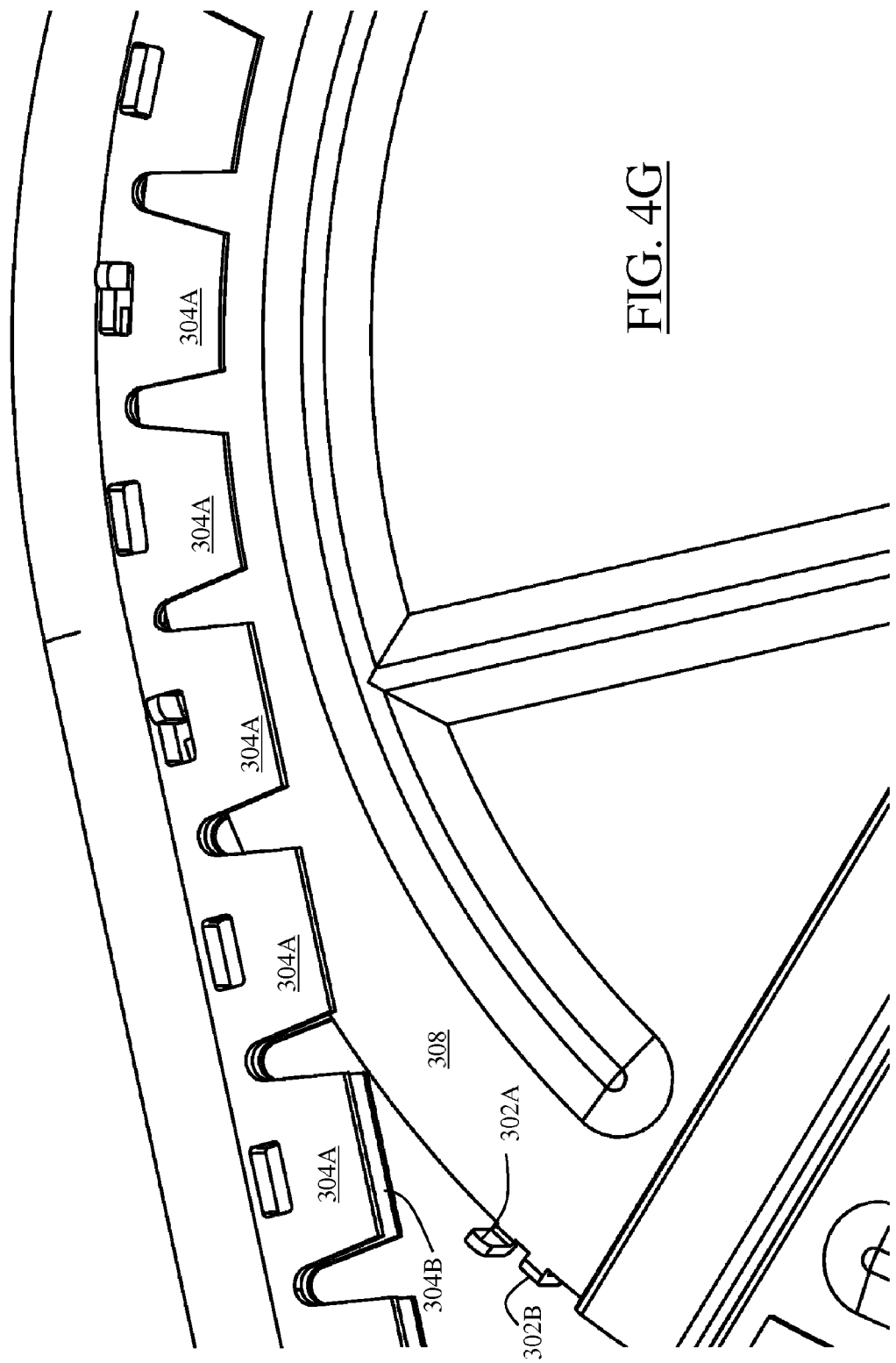

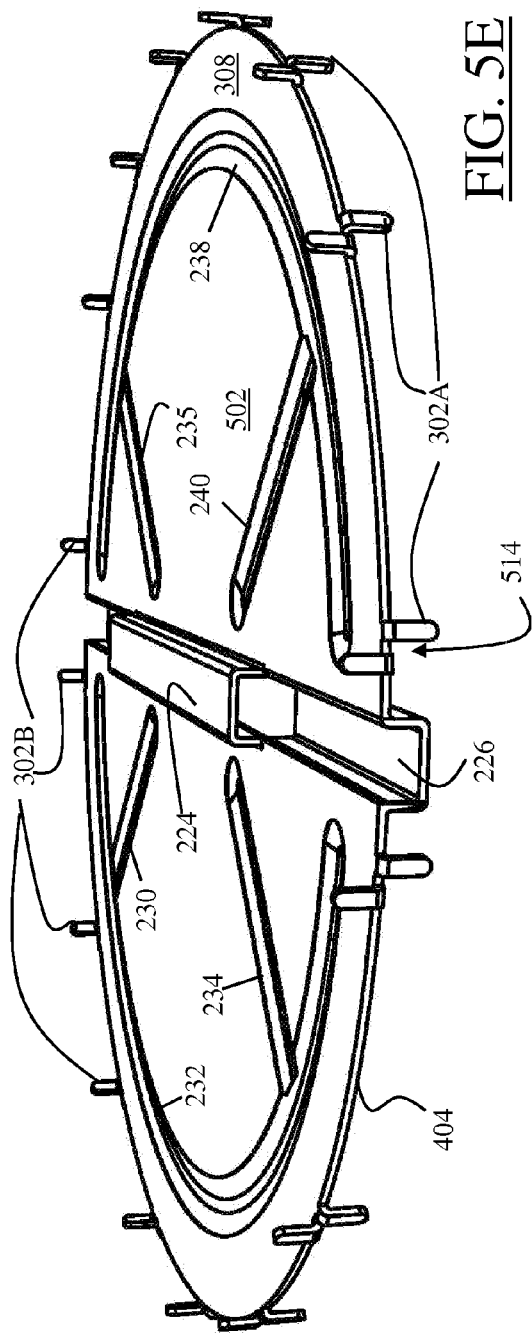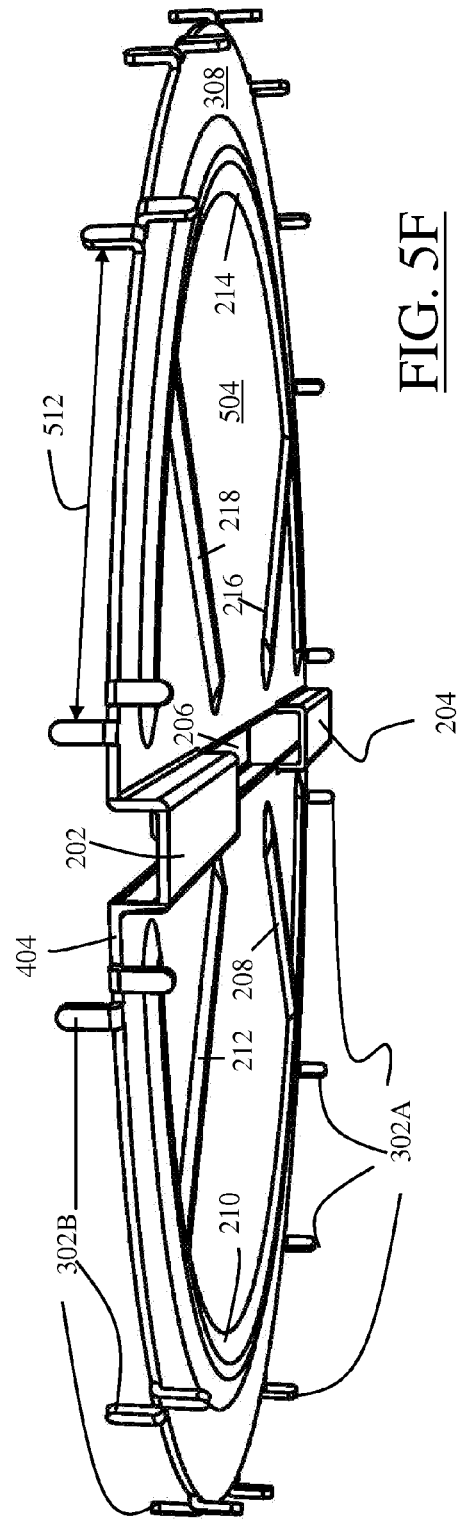
FIG. 5E
FIG. 5F

DAMPER MECHANISM

CROSS-REFERENCE TO RELATED APPLICATIONS

This Application claims the benefit of priority of U.S. Utility Provisional Patent Application No. 61/201,655, filed 12 Dec. 2008, the entire disclosure of which is expressly incorporated by reference in its entirety herein.

BACKGROUND OF THE INVENTION

1. Field of the Invention

This invention relates to Heating, Ventilation, and Air Conditioning (HVAC) and, more particular to zone control using a sealed damper mechanism.

2. Description of Related Art

Conventional damper mechanisms used for zone control are well known and have been in use for a number of years. Reference is made to the following few exemplary U.S. Patent Publications, including U.S. Pat. Nos. 6,435,211; 5,944,098; 5,921,277; 5,899,805; 5,863,246; 5,788,218; 5,318,104; 4,917,350; 4,766,807; 4,691,689; 4,674,528; 3,861,503; 3,295,821; 2,835,467; and 1,517,335.

As indicated in the relevant publications, the operational effectiveness of the damper mechanism in the closed position depends upon the tightness of the damper seal with respect to the damper blade and the plenum (or sleeve) within which the damper mechanism is used for zoning. Further, the sealing surfaces of the damper mechanism should also be resistant to the fluids, the flows of which are controlled by the damper mechanism.

As further disclosed in relevant publications, in designing the specific geometry and mounting configuration of the damper blade seals, several interrelated factors need to be taken into account. These factors include sealing ability, closing force, friction, blade twist, drive requirement, tolerance of misalignment, and overshoot. Sealing ability is generally a function of the closing force of the damper blade and/or the radial interference at the damper seal between the damper blade and the inlet opening of the plenum (or sleeve). Increasing the closing force, however, often requires the use of relatively large drives and sturdy damper blades that resist twisting. Likewise, increasing radial interference increases friction, which also requires larger drives and sturdier damper blades. Overshoot is the distance the damper blade attempts to travel after reaching its intended closed position. Some damper seal designs have an abrupt closing point that provide little or no tolerance to damper blade twist or overshoot, making them susceptible to both leakage and damage, such as cracking. Lightweight damper blades driven by small drive motors are usually sensitive to overshoot or allow only the use of lightweight damper seals that provide inadequate sealing.

Regrettably, with most conventional damper mechanisms, the damper seal is mounted with the damper blade using glues, rivets, snap-on fits, or retainers, all of which are disadvantageous. Use of glues to couple the damper seal to the damper blade is unacceptable because most adhesives are not resistant to the fluids, the flow of which is controlled by the damper mechanism. That is, glues or adhesives dry and loose their retaining ability. As to the use of interferences such as rivets to mount the damper seal to the damper blade, rivets or other interferences tear into the damper seal, which over time can create cracks along the tear, resulting in separation of the damper seal from the damper blade. With respect to the use of snap-ON fits, these will not function in high volume or high pressure HVAC systems because they can easily snap-OFF within high volume/pressure fluid flow, resulting in the damper seal being separated from the damper blades. Regarding the use of retainers to mount the damper seals onto the damper blades, most retainers used do not fully retain all of the damper seal body on the damper blade. That is, prior art retainers only partially secure the distal ends of the damper seal with the damper blade, with the remaining sections of the damper seal frictionally fitted onto the damper blade, which can become loose. This will enable controlled fluid to pass underneath the loosened damper seal, cracking the seal, making it crumble into small pieces, which is then pushed out of the vents and into a room, polluting the air.

It is important to notice that, in order to replace damper mechanisms or the damper seal itself due to damaged to the damper seals, it is necessary to have physical access to the dampers, which are installed within the plenum (or sleeve), which, in turn, is installed inside of an already constructed structure such as a wall or ceiling. That is, physical access to the damper mechanisms is something not always available and highly dependent upon details of the construction site. Further, in general, most HVAC systems that include damper mechanisms also include insulating material that is normally placed around the plenum, sleeves or ducts, completely covering the entire unit. Accordingly, demolishing and then complex re-construction of walls, ceilings, or other permanently build structures would be required for the replacement of the damper mechanisms. Therefore, failure of a damper seal would be costly in both parts production and required labor for replacement.

As indicated above, the sealing ability of the damper seal is generally a function of the radial interference at the damper seal between the damper blade and the inlet opening or the inner walls of the conduit (or sleeve). Several interrelated factors influence the overall sealing ability of the damper seal. Most damper seals are comprised of soft, thin, flexible polymer or resin material that over time tend to loose their flexibility, deform, and retain a specific configuration. The fluids, the flows of which are controlled by the damper mechanism, tend to degrade the soft, flexible qualities of the damper seals over time. The shapes the damper seals conform to are commensurate to the orientation or position of the dampers. In other words, for example, if damper seals in an open position are bent along the outer periphery radial edges for a long duration, then, over time, the outer periphery radial edges of damper seals loose their flexibility and conform or retain the bent configuration and become deformed. Stated otherwise, the damper seals form a "memory," loosing their sealing quality by conforming to a specific unwanted shape (become deformed). When the same damper seals are moved from an open position to a closed position, the outer periphery edges of damper seals will retain their bent (deformed) orientation, and not be able to fully close to seal off fluid flow.

Accordingly, in light of the current state of the art and the drawbacks to current damper mechanisms mentioned above, a need exists for a mounting system that would mount a damper seal onto a damper blade without using any component(s) such as adhesives, rivets, retainers, etc, and that would allow the damper seal to retain its shape, and would require minimum maintenance.

BRIEF SUMMARY OF THE INVENTION

The present invention discloses a damper mechanism, comprising:
  a single piece damper blade, having:

a first single continuous shaft bridge at a proximate center at a first side of the damper blade and one or more second shaft bridges at a distal ends of a second side of the damper blade;

a reinforcing ridge that is positioned a distance D away from periphery of the damper blade;

a first tie-down tab facing the first side of the damper blade, and a second tie down tab facing the second side of the damper blade, with the first tie-down tab and the second tie-down tab forming a tie-down tab pair, with the tie-down tab pair positioned along a periphery edge of the damper blade for coupling a damper seal with the damper blade.

An exemplary optional aspect of the present invention provides a damper mechanism, wherein:

the first single continuous shaft bridge at the first side of the damper blade includes a first axial center aligned parallel along a first longitudinal axis of the first continuous shaft bridge;

the second, one or more shaft bridges at the second side of the damper blade have common axial centers that are aligned parallel along a second longitudinal axis of the second, one or more shaft bridges; and first axial center of the first continuous shaft bridge is aligned with the common axial centers of the second, one or more shaft bridges.

Another exemplary optional aspect of the present invention provides a damper mechanism, wherein:

the reinforcing ridge is comprised of a protuberance in the first side of the damper blade and a corresponding complementary recess on the second side of the damper blade, forming an embossment on the first side and corresponding complementary impression on the second side.

Still anther exemplary optional aspect of the present invention provides a damper mechanism, wherein:

The damper mechanism as set forth in claim 3, wherein:
the reinforcing ridge is comprised of a plurality of stiffening beads.

A further exemplary optional aspect of the present invention provides a damper mechanism, wherein:

the tie-down tab pair is comprised of a plurality of tie-down tab pairs that are positioned along the periphery edges of the damper blade.

Still a further exemplary optional aspect of the present invention provides a damper mechanism, wherein:

the first tie-down tab is a distance T from the second tie down tab, forming the tie-down tab pair.

Another exemplary optional aspect of the present invention provides a damper mechanism, wherein:

a major body portion of a damper seal body is coupled with the damper blade using the tie-down tab pair for maintaining the damper seal body congruent, consistent with damper blade first and second sides.

Yet another exemplary optional aspect of the present invention provides a damper mechanism, wherein:

the damper seal is comprised of:

a top that extends longitudinally along an axial length of the damper seal;

a support protruded from the top, extending longitudinally along an axial length of the top;

a first flap and a second flap having a first side separately integral with the support and separated at a distance spacing $F_{DS}$ for forming a channel, with the first flap and the second flap forming a flap-pair for inserting the periphery edge of the damper blade within the channel between the flap-pair; and an aperture positioned along the first side of the first flap and the second flap for insertion of the tie-down tab pair for locking the damper seal with the damper blade.

A further exemplary optional aspect of the present invention provides a damper mechanism, wherein:

The first and the second flap have a substantially trapezoid configuration with a longer base integral the protrusion;

a free shorter base that is parallel with the longer base; and legs that have equal length and are substantially free.

Another exemplary optional aspect of the present invention provides a damper mechanism, wherein:

the flap-pair is comprised of a plurality of flap pairs that are positioned along the axial length of the support, with the legs of one flap-pair and an adjacent flap-pair separated by a distance, forming a notch in a form of a syncline.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding part(s) throughout:

FIGS. 1A to 1D are exemplary illustrations of an assembled damper mechanism coupled within a sleeve (or conduit) in accordance with the present invention;

FIGS. 3A and 3B are exemplary perspective enlarged illustrations of the damper mechanism, providing an overview of a mounting system of the damper seal onto the damper blade in accordance with the present invention;

FIGS. 4A to 4I are exemplary perspective illustrations that progressively show the disassembly and removal of the damper seal from the damper blade in accordance with the present invention;

FIGS. 5A to 5F are exemplary perspective illustrations of the damper blade in accordance with the present invention.

DETAILED DESCRIPTION OF THE INVENTION

Figure 1A:
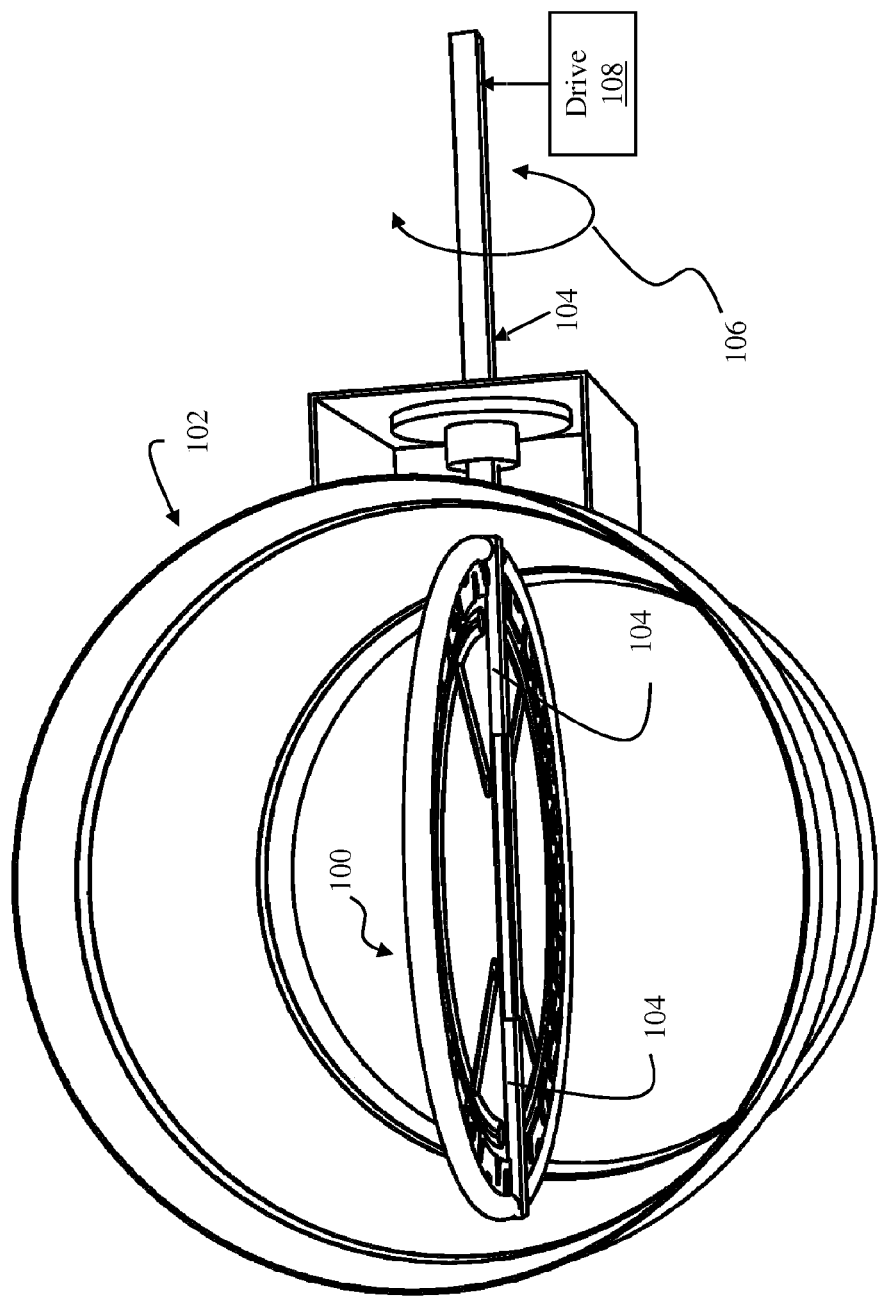
Figure 1B:
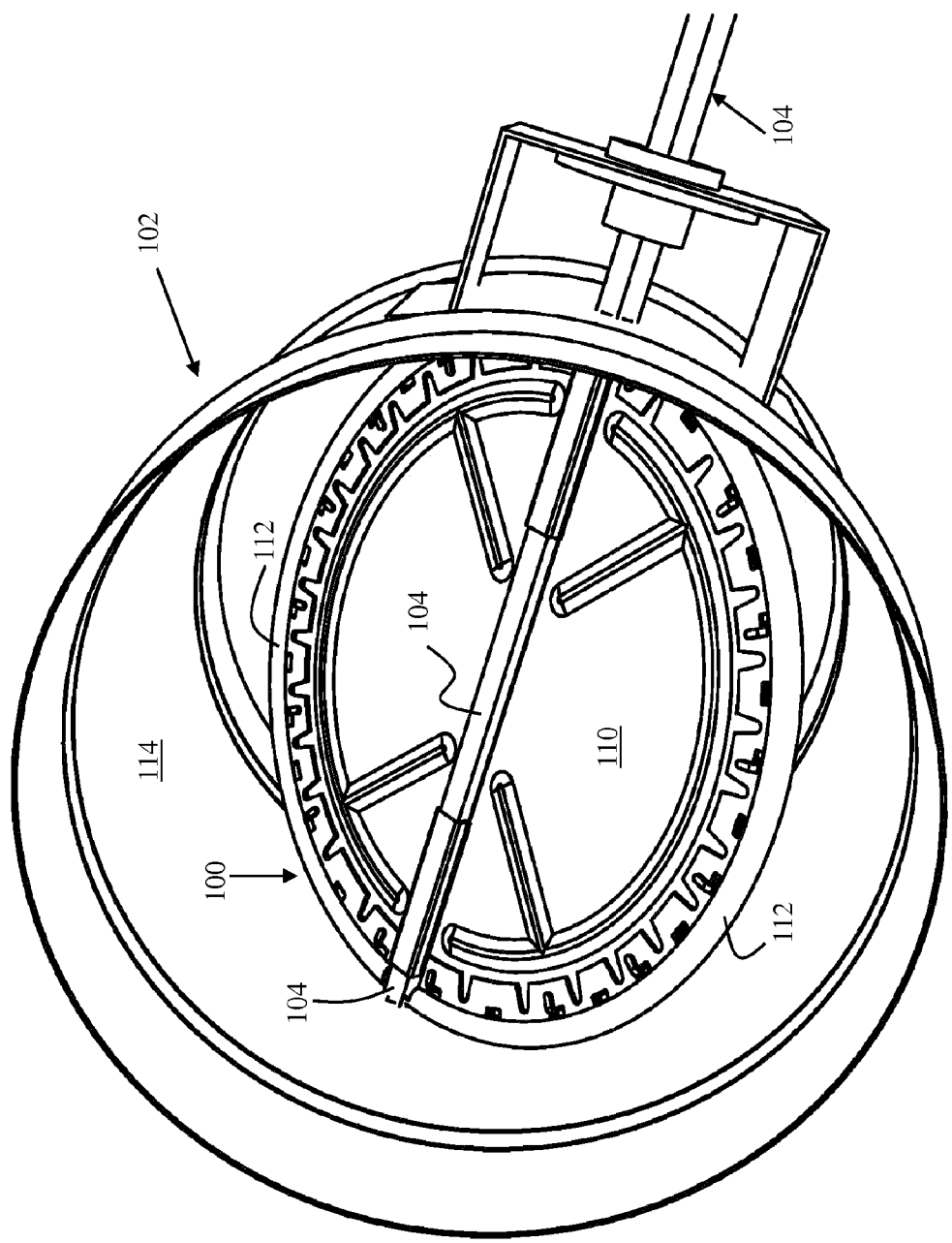
Figure 1D:
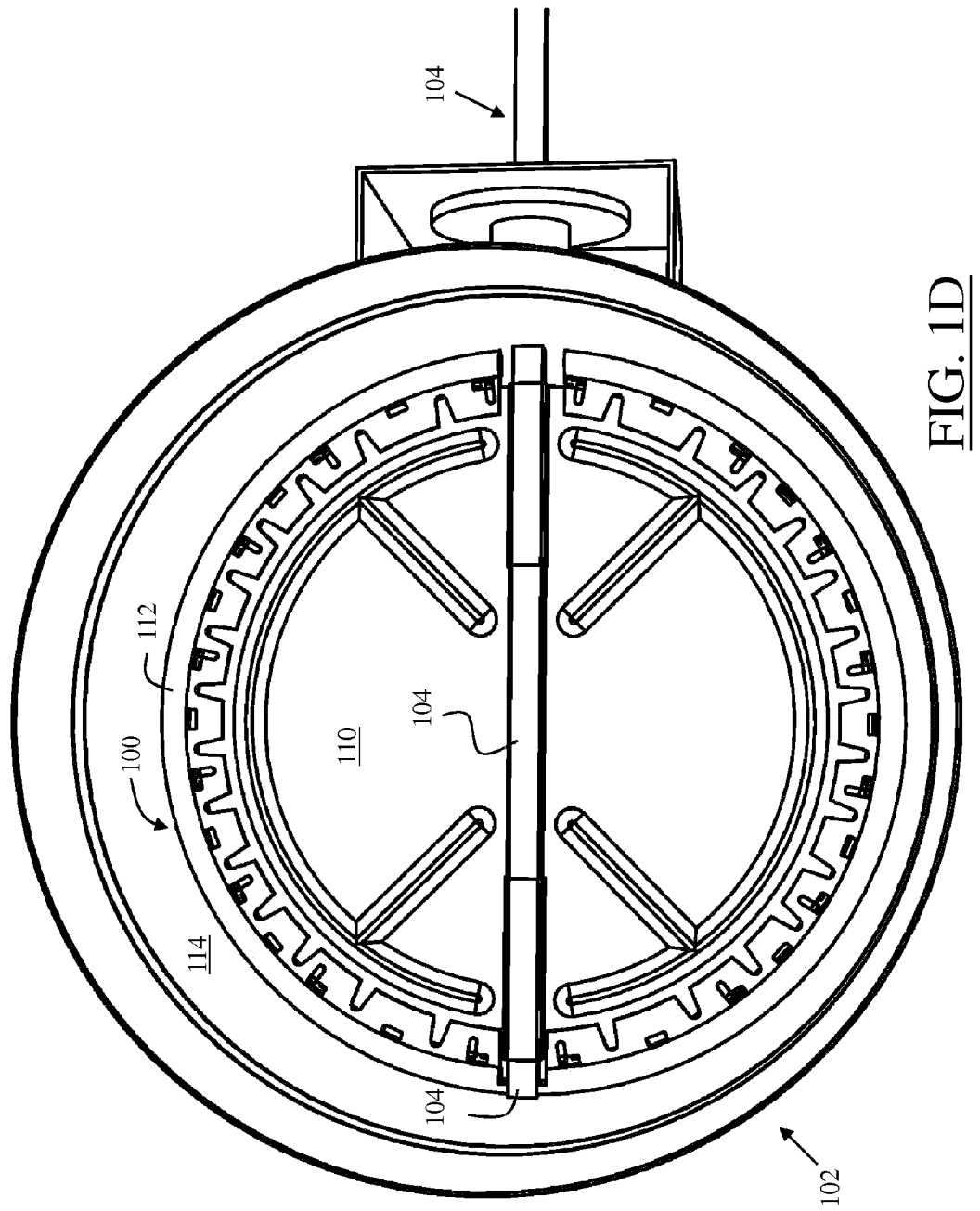

The detailed description set forth below in connection with the appended drawings is intended as a description of presently preferred embodiments of the invention and is not intended to represent the only forms in which the present invention may be constructed and or utilized.

FIGS. 1A to 1D are exemplary illustrations of an assembled damper mechanism 100 coupled within a sleeve (plenum or conduit) 102 in accordance with the present invention. FIGS. 1A to 1D illustrate a non-limiting exemplary environment within which the exemplary damper mechanism 100 of the present invention may be used for fluid flow control. Further, the shape of the damper mechanism 100 shown may be varied and should not be limited to the exemplarily illustrated disc like structure. That is, the form-factor of the damper mechanism 100 may be commensurate with the environment within which it is used. In other words, if the damper mechanism 100 is used in an exemplary cylindrical sleeve 102 with a circular cross-section, then one optional configuration for fluid flow control within such an environment would be a damper mechanism 100 with the illustrated disc like structure. Other configurations for a damper mechanism 100 are contemplated, non-limiting examples of which may include any polygonal shape, with variety of dimensions (thickness, length, etc.).

As further illustrated, FIGS. 1A to 1D progressively show the closing of the damper mechanism 100 from an open position. The damper mechanism 100 is rotationally mounted within the sleeve 102 by a continuous shaft 104, and is positioned in relation to a longitudinal axial center opening of the sleeve 102. The continuous shaft 104 may rotate or pivot along a reciprocating path indicated by the arrow 106 by a drive mechanism 108, non-limiting examples of which may include manual or auto devices such as a handle or a motor.

As further illustrated, in the closed position, damper blade 110 of the damper mechanism 100 can substantially blocks fluid flow through sleeve 102. Flexible polymeric damper seal 112 of the damper mechanism 100 further assists in blocking fluid flow by preventing fluid such as air from leaking past the damper mechanism 100. The damper seal 112 is positioned between an outer periphery edge of damper blade 110 and an adjacent inner surface 114 of the sleeve 102. That is, the damper seal 112 extends from damper blade outer periphery edge, and contacts with the adjacent inner surface 114 of the sleeve 102. The mounting system and the form-factor of the damper seal 112 in relation to the damper blade 110 increase tightness between the damper blade 110 and the inner surface 114 of the conduit (or sleeve) 102, improving operational effectiveness of the damper mechanism 100 in its closed position and hence, improving efficiency. It should be noted that the damper seal 112 could be made of any flexible material.

Figure 2A:
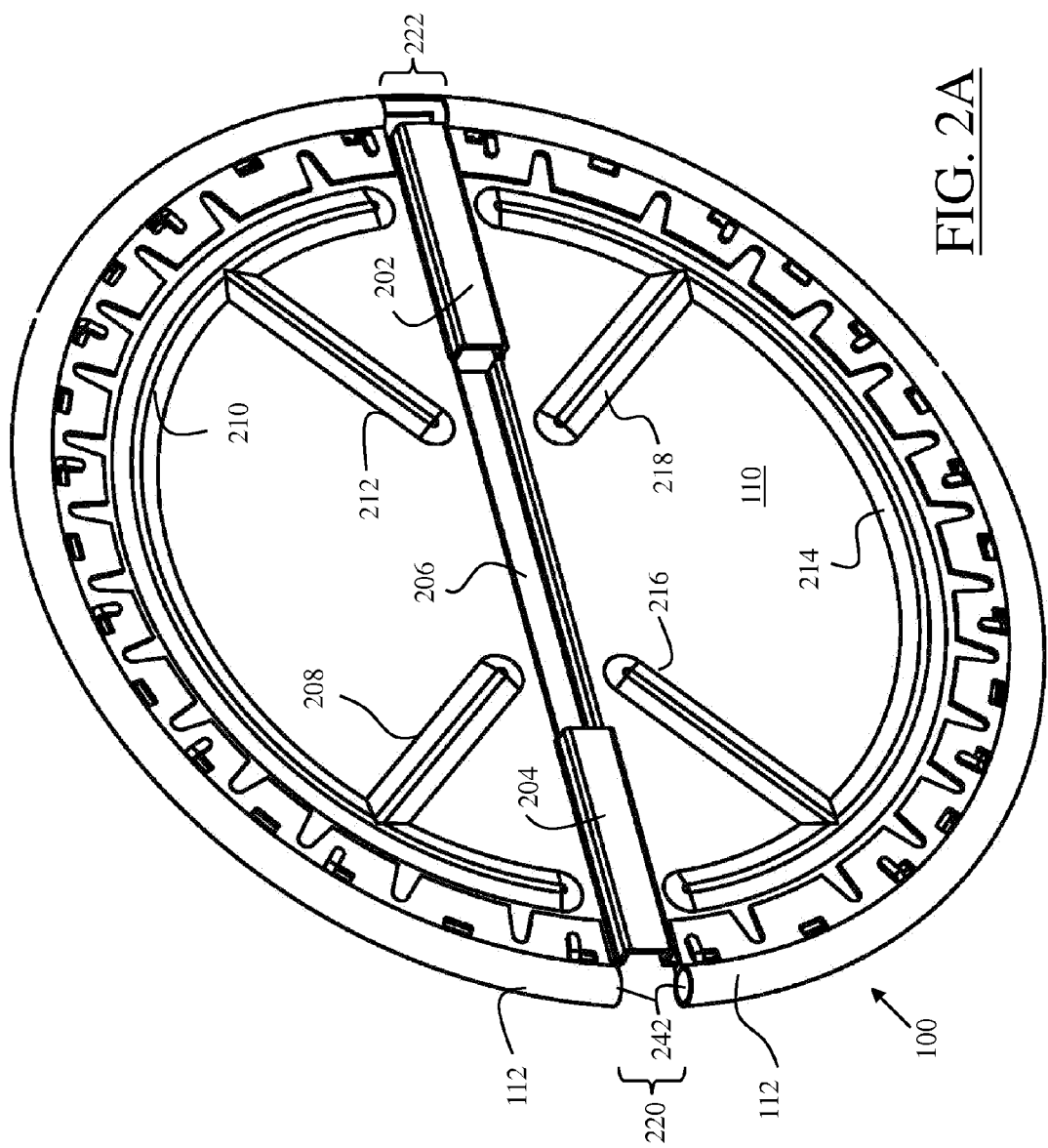
FIGS. 2A and 2B are exemplary perspective view illustrations of one side of a damper mechanism in accordance with the present invention.
Figure 2B:
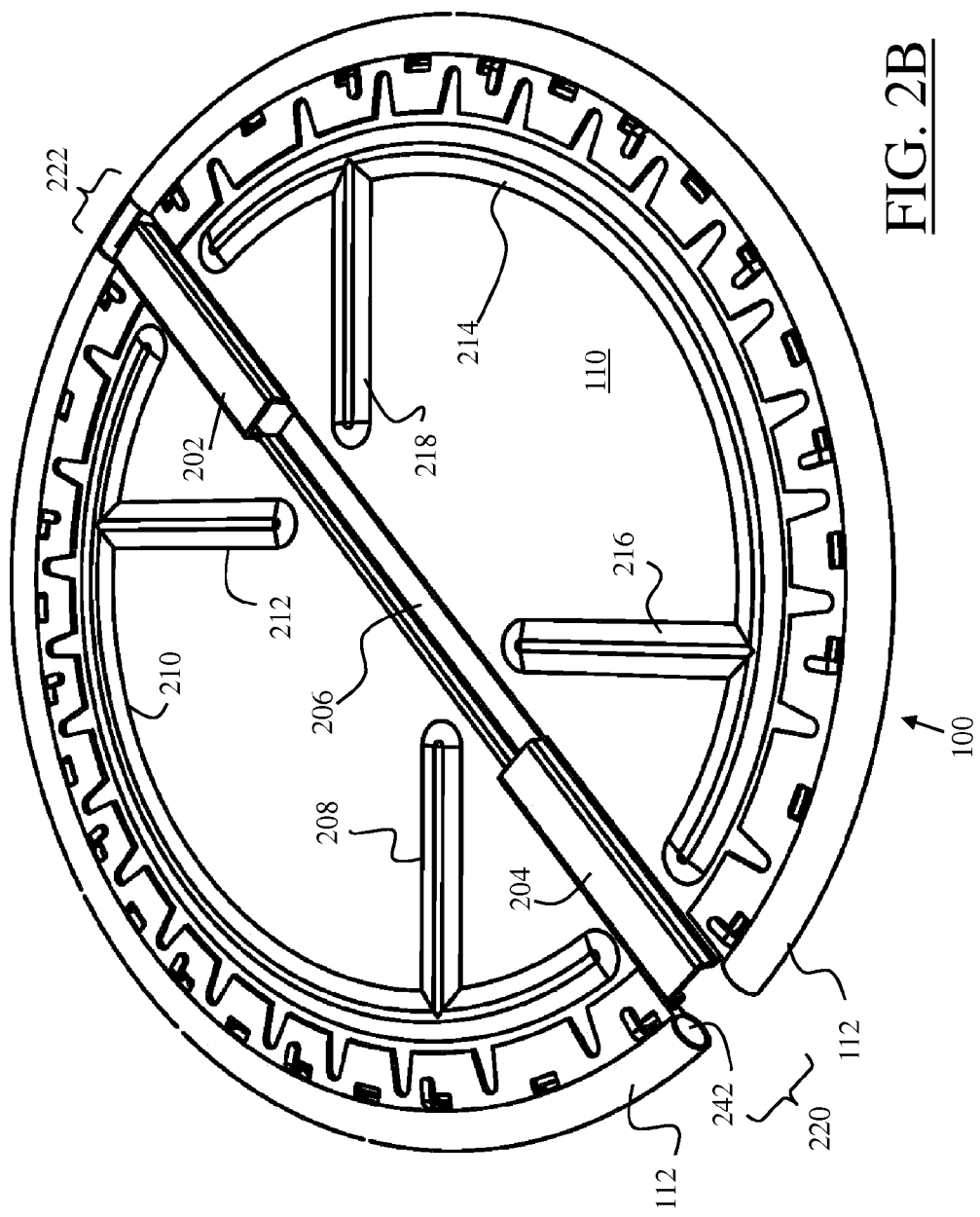
Figure 2C:
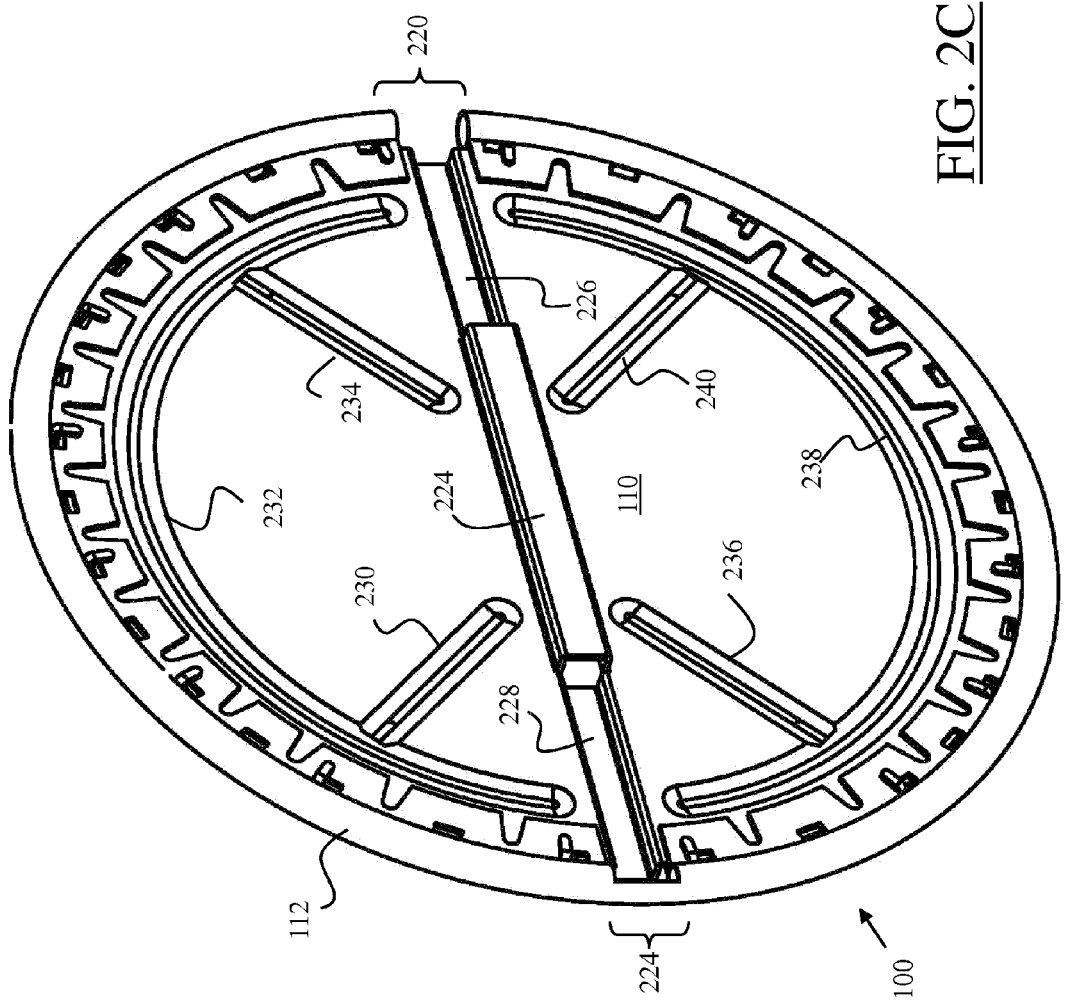
FIGS. 2C and 2D are exemplary perspective view illustrations of the other side of the damper mechanism illustrated in FIGS. 2A and 2B in accordance with the present invention.
Figure 2D:
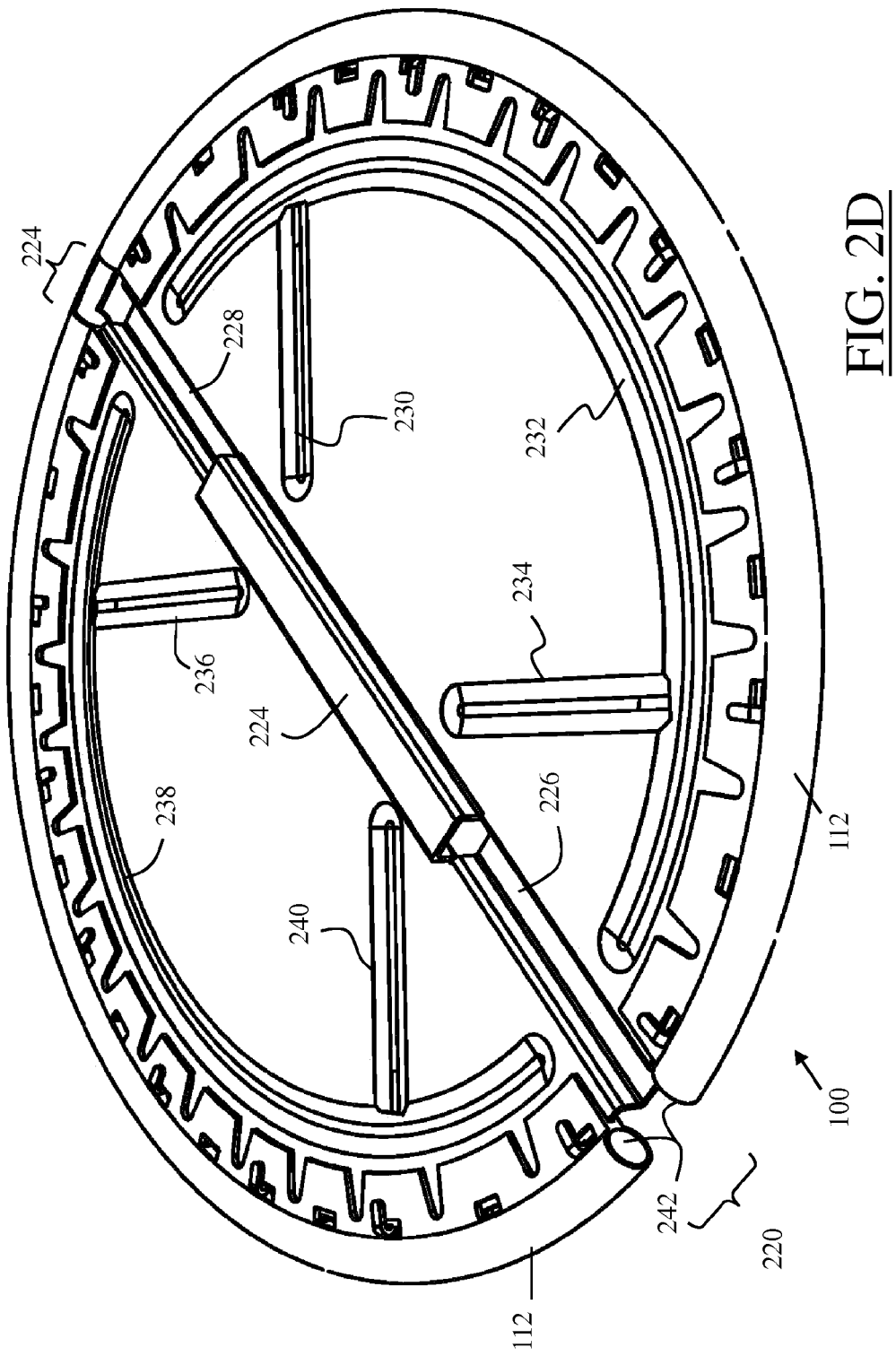

FIGS. 2A and 2B are exemplary perspective view illustrations of one side of a fully assembled damper mechanism 100 in accordance with the present invention. FIGS. 2C and 2D are exemplary perspective view illustrations of the other side of the same fully assembled damper mechanism 100 illustrated in FIGS. 2A and 2B in accordance with the present invention. As illustrated in FIGS. 2A to 2D, a major body portion of a damper seal 112 is coupled with the damper blade 110 for maintaining the damper seal 112 congruent, consistent with damper blade 110 form-factor. This arrangement also provides a low-profile seal mechanism with the majority of the seal body on the damper blade 110, with external forces mostly applied to the damper blade 110 rather than the damper seal 112. In other words, due to the above arrangement and low-profile configuration of the damper seal 112, the weight of the damper seal 112 itself or pressure differentials within a vent or sleeve 102 on the damper seal 112 is carried by the damper blade 110, and will not effect or deform the damper seal 112. Therefore, in accordance with the present invention, most of the force causing deformation of the damper seal 112 (whether due to the weight of the damper seal 112 itself, the pressure differentials, or most any other reasons), is carried by the damper blade 110. Accordingly, the deforming pressures on the damper seal 112 is minimized, and the damper seal 112 maintains its original shape and, hence, its sealing ability. In addition to being low-profile with the major body portion being on the damper blade 110, the mounting system of the damper seal 112 with the damper blade 110 maintains the damper seal 112 completely snug and tight-fit against the damper blade 110. The snug and tight-fit damper seal 112 will prevent controlled fluid from passing underneath the damper seal 112, which can dry, crack, and crumble the damper seal 112 into small pieces, which then might be pushed out of the vents and into a room, polluting the air. In addition, the low-profile and snug/tight-fit arrangement of the damper seal 112 in relation to the damper blade will provide very negligible room for the movement of the damper seal 112 and hence, low possibility of forced deformation.

Figure 3B:
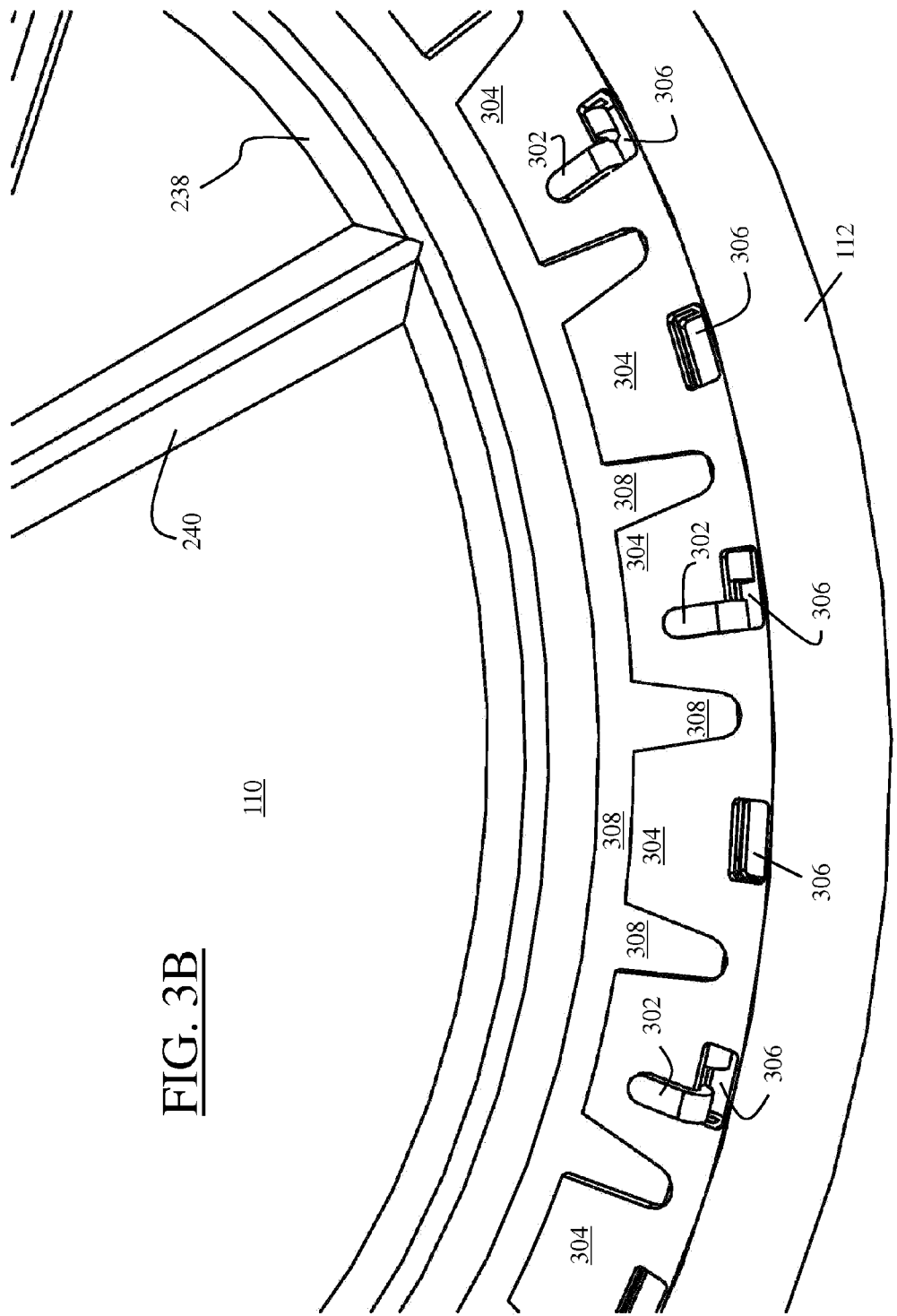

FIGS. 3A and 3B are exemplary perspective enlarged illustrations of the fully assembled damper mechanism 100, providing an overview of a mounting system of the damper seal 112 onto the damper blade 110 in accordance with the present invention. As illustrated, the major body portion of the damper seal 112 is coupled with the damper blade 110 by a plurality of tie-down tabs 302 (details of which are provided below). The tie-down tabs 302 are inserted through apertures 306 and bent onto a flap portion 304 of the damper seal 112, securing the damper seal 112 to the radial distal section 308 of the damper blade 110. This arrangement maintains the entirety of the damper seal 112 congruent, consistent with damper blade 110 shape, provides a low-profile damper seal 112, and a complete snug/tight-fit coupling between the damper blade 110 and the entirety of the damper seal 112. The use of tie-down tabs 302 in accordance with the present invention obviates problems associated with the use of adhesives such as glues to couple the damper seal 112 with the damper blade 110, which may dry or loose their adhesive function. In addition, tie-down tabs 302 also correct problems associated with the use of prior art retainers, which do not fully retain all of the damper seal body on the damper blade. The tie-down tabs 302 are also advantageous compared to the use of prior art interferences such as rivets that puncture, and may tear the damper seal. The tie-down tabs 302 are also beneficial over the use of prior art snap-ON fits in that the tie-down tabs 302 will enable the damper mechanism 100 to function in high volume or high pressure HVAC systems, with exemplary high volume of fluid in the exemplary range of approximately 0.5 W.G. to 10 W.G. (inches of Water Gauge) and exemplary high pressure in the exemplary range of about 125 Pa to 2500 Pa (Pascal). The tie-down tabs 302 securely maintain the low-profile, snug/tight-fit coupling between the damper seal 112 and the damper blade 110, preventing the damper seal from separating from the damper blade 110 under high pressure/volume fluid flows.

Figure 4A:
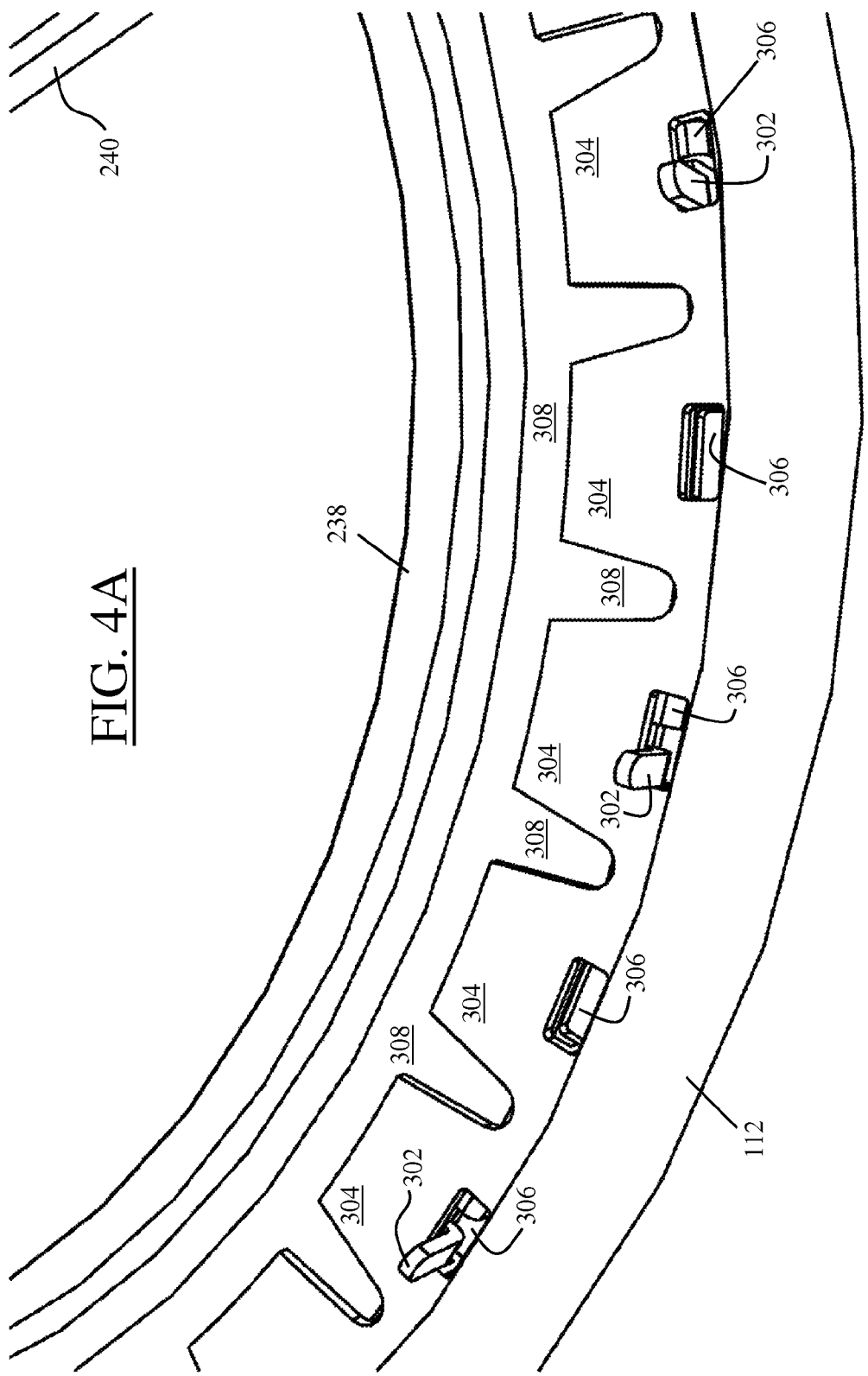
Figure 4B:
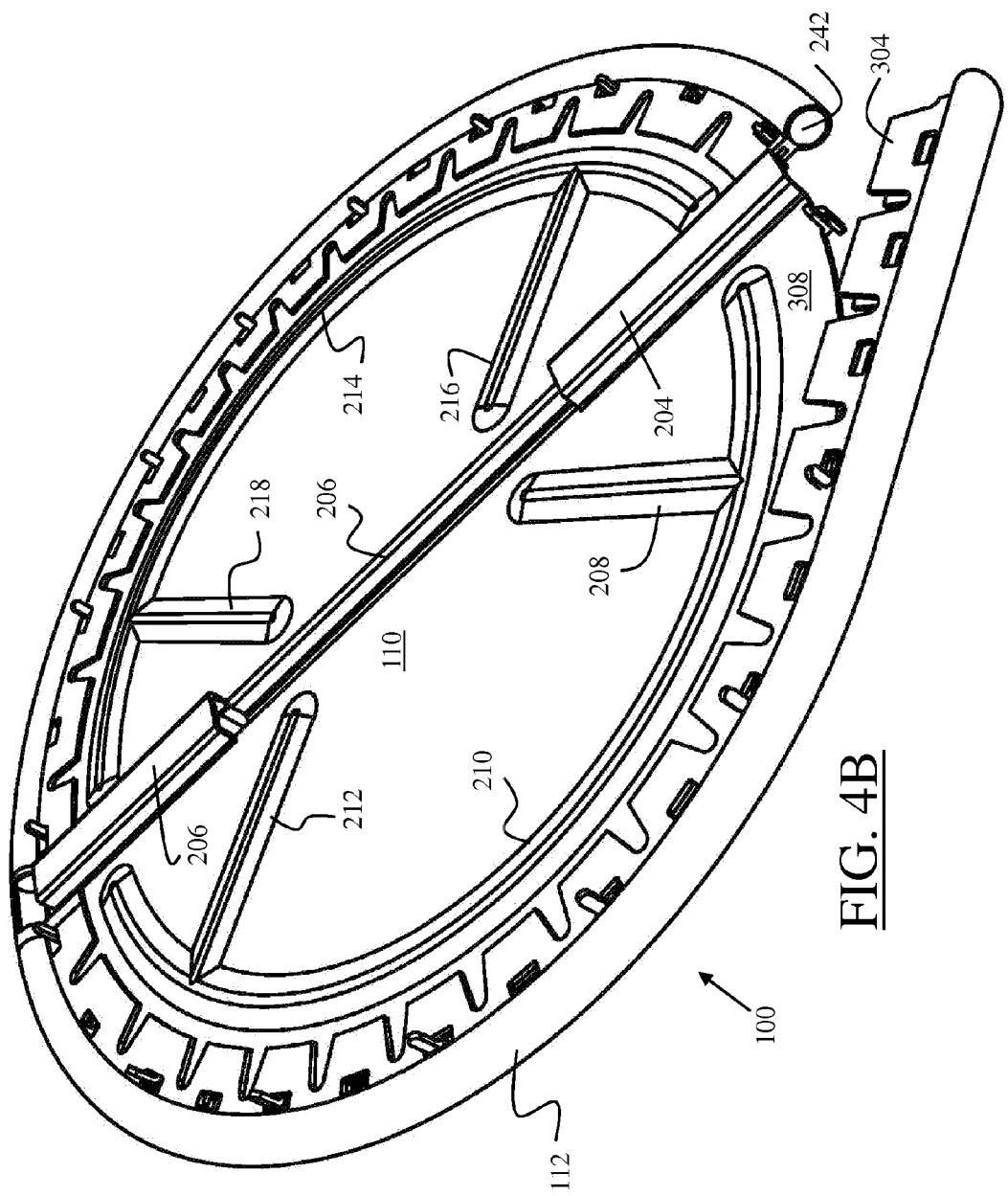
Figure 4C:
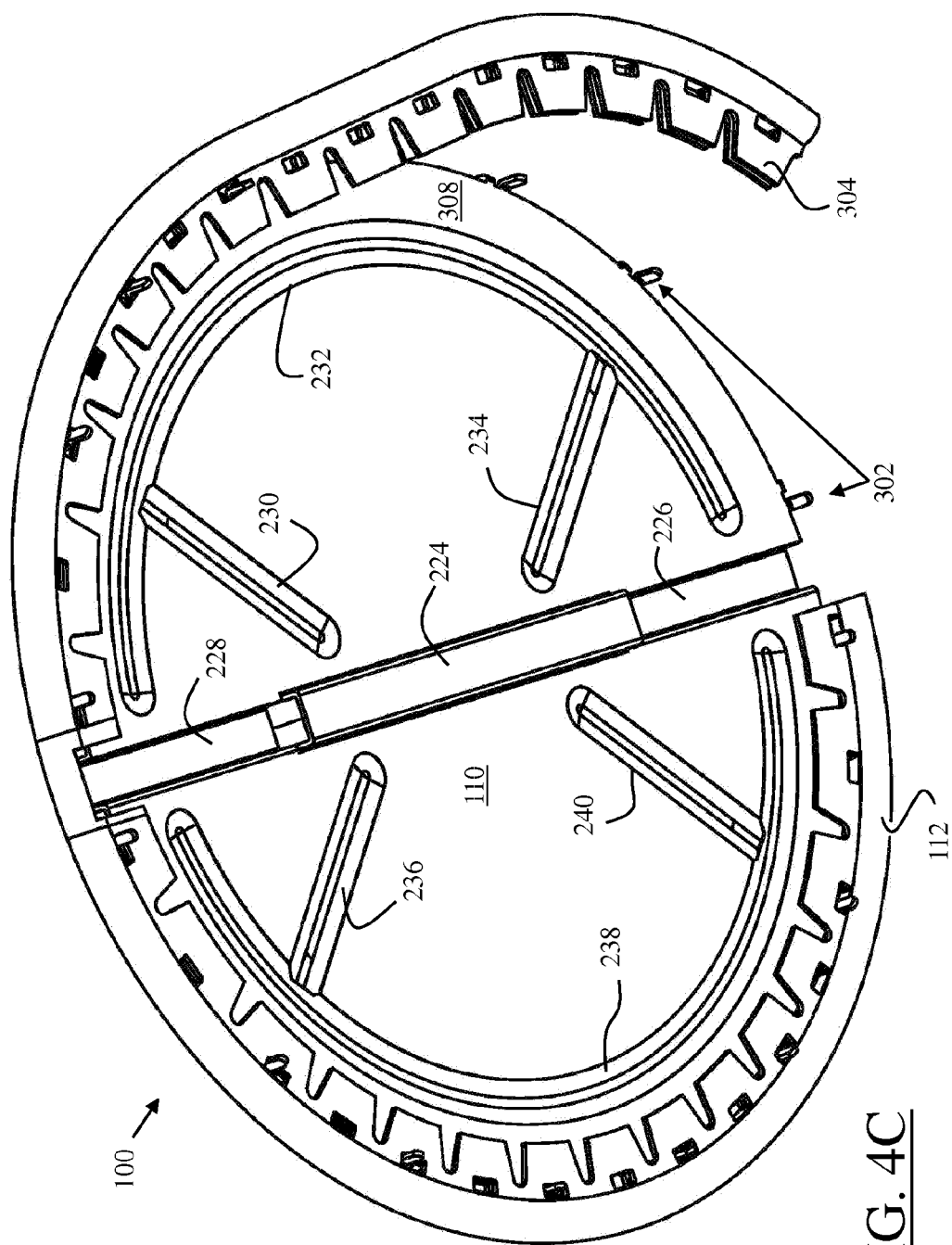
Figure 4D:
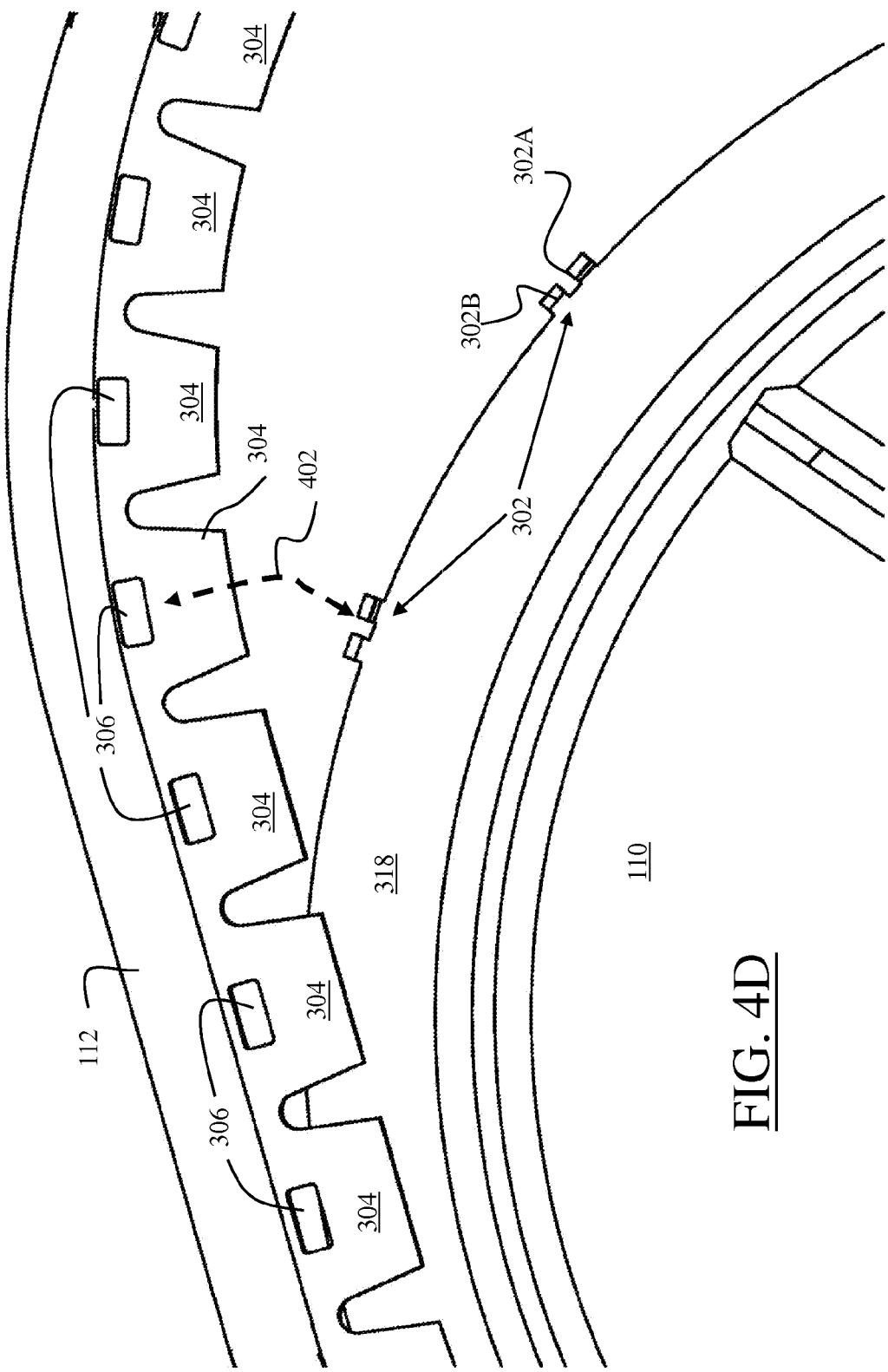
Figure 4E:
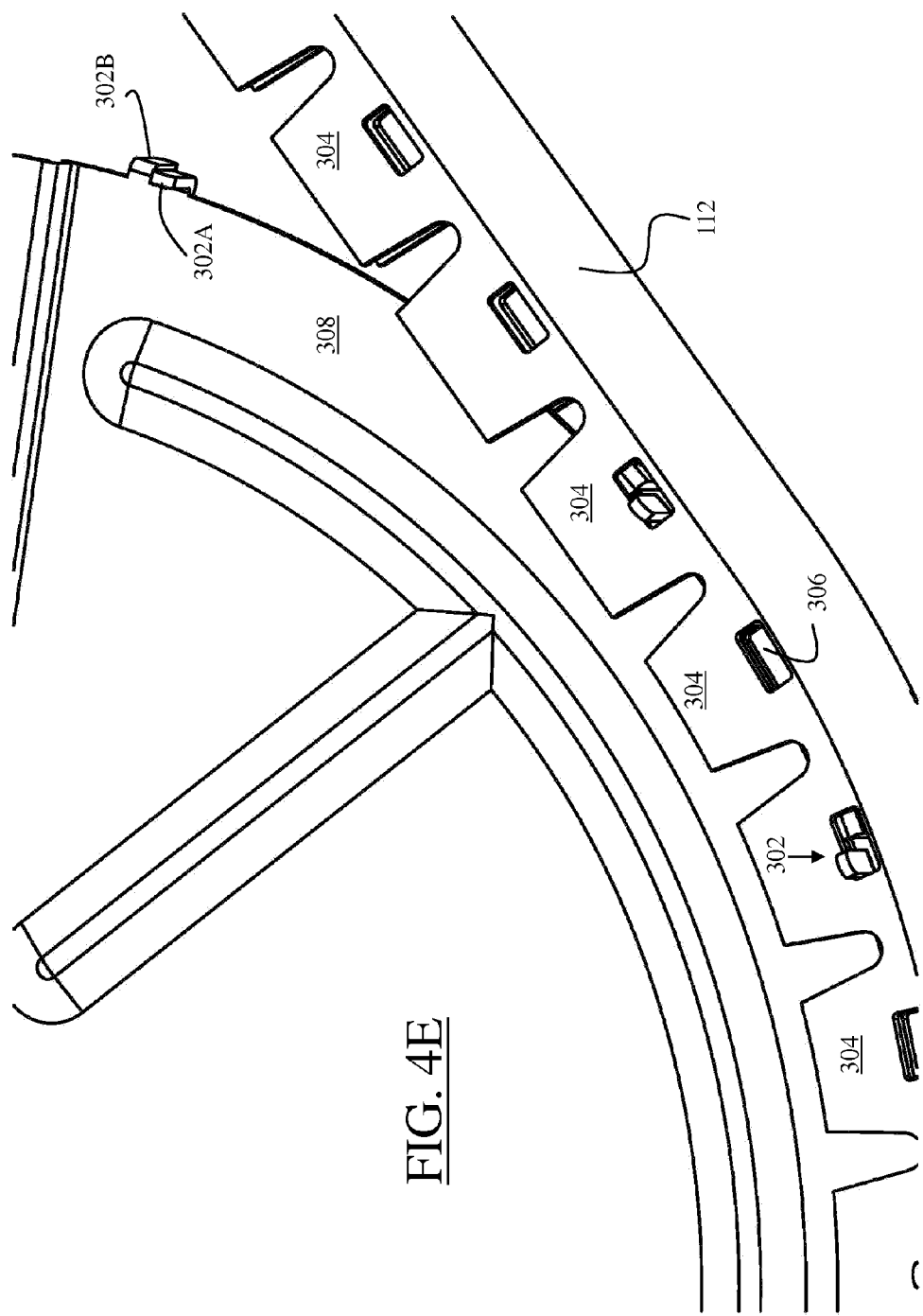
Figure 4F:
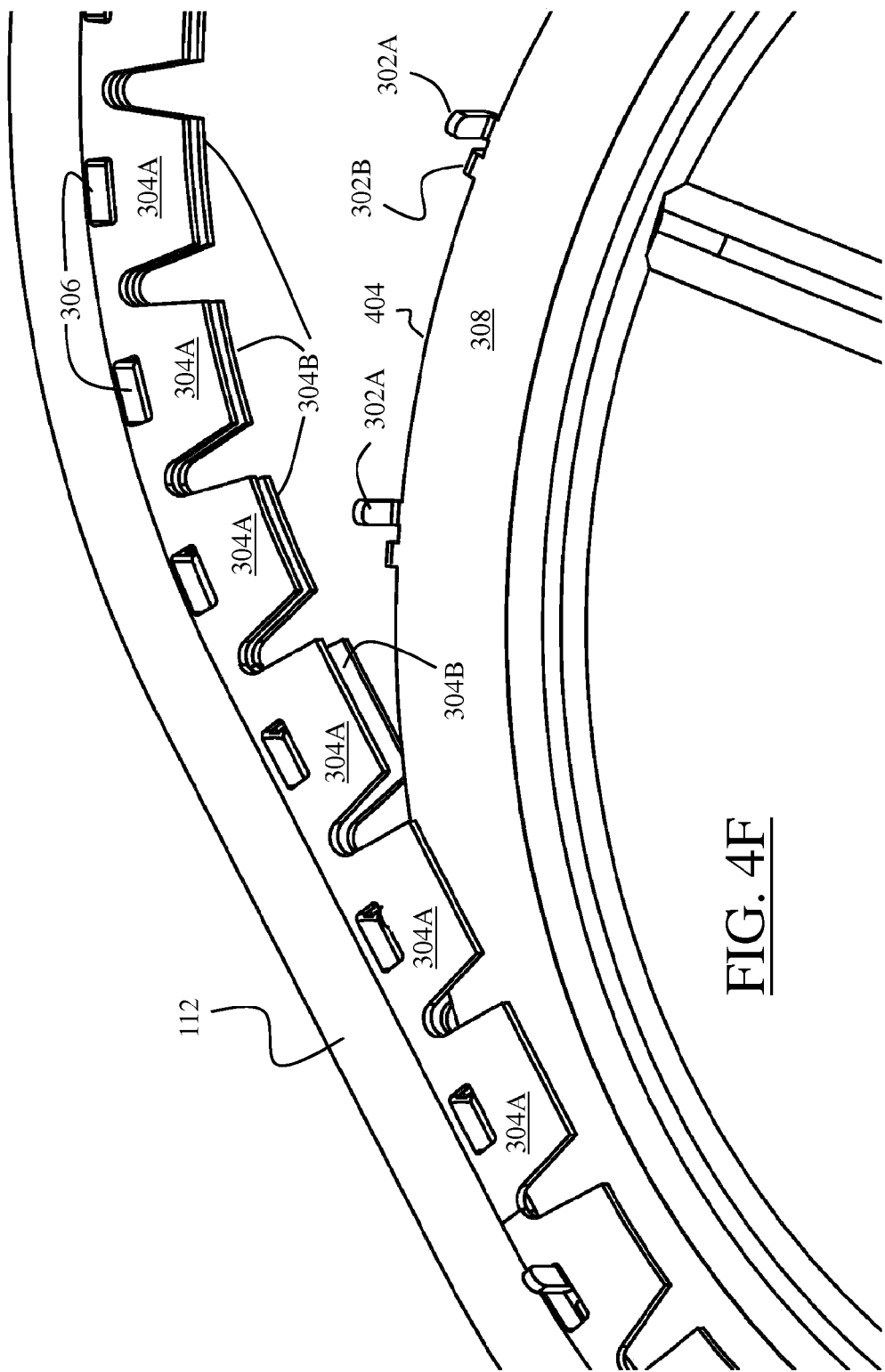
Figure 4H:
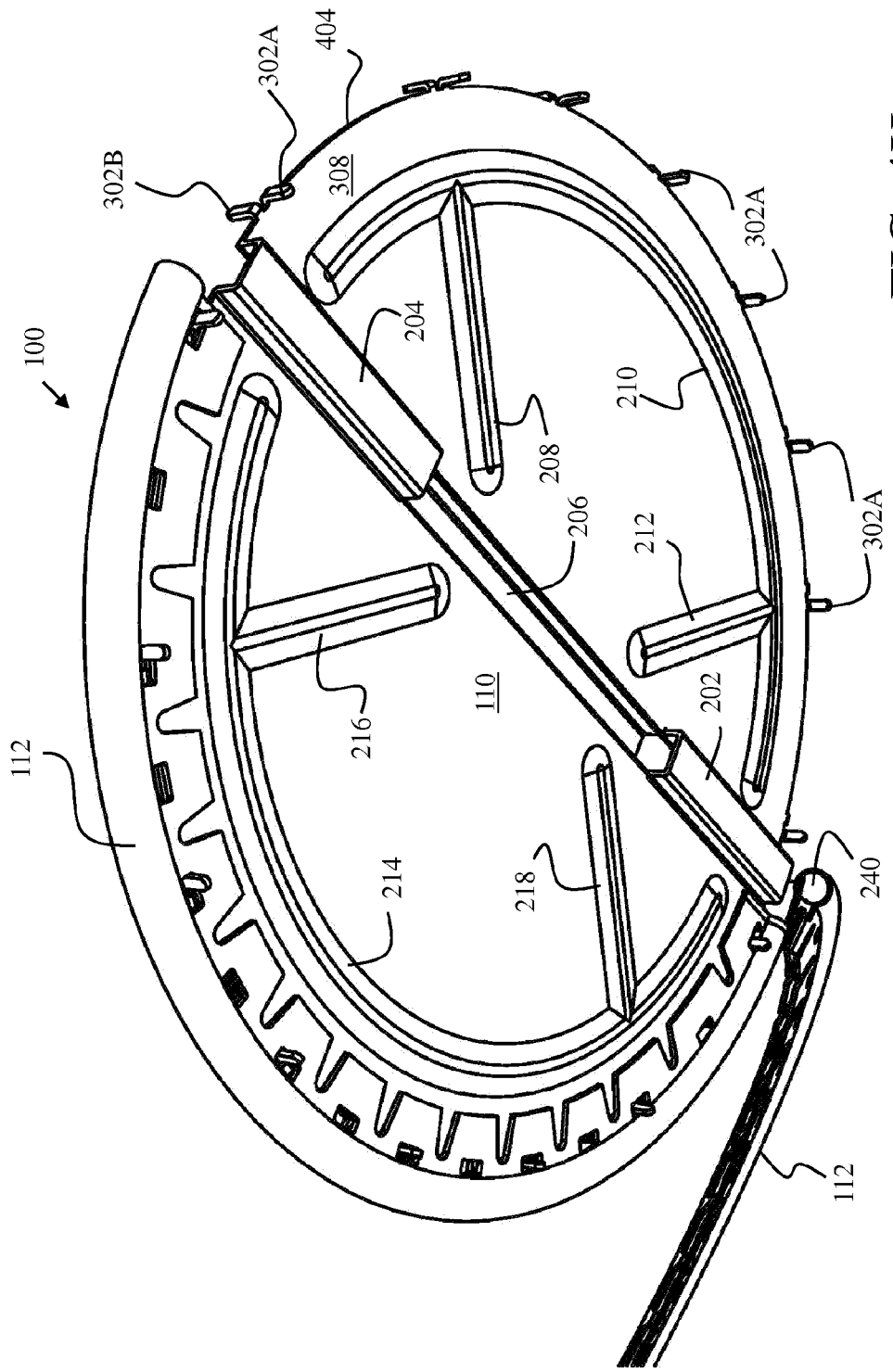
Figure 4I:
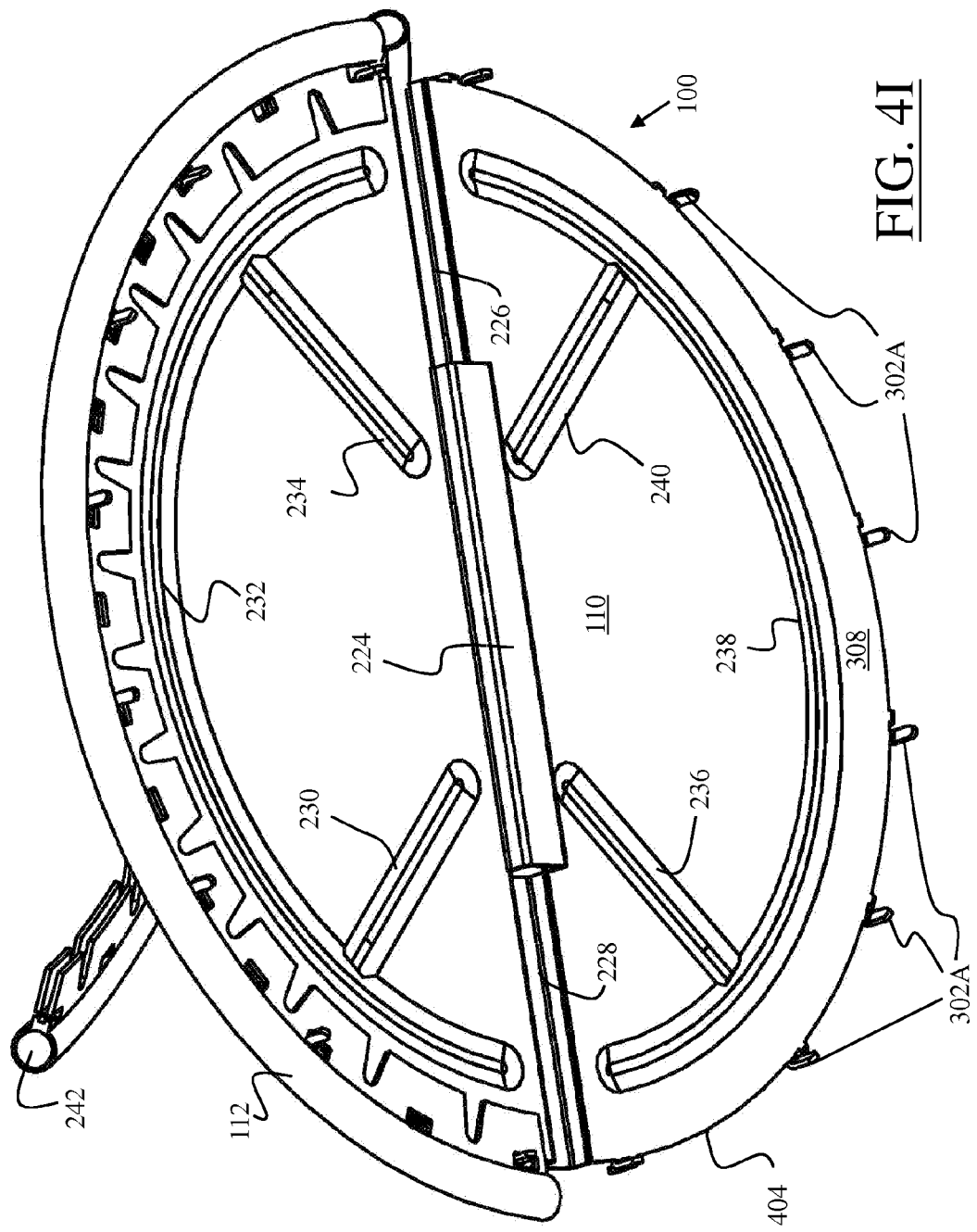

FIGS. 4A to 4I are exemplary perspective illustrations that progressively show the disassembly and removal of the damper seal from the damper blade in accordance with the present invention. As illustrated in FIG. 4A, in order to remove (or replace) the damper seal 112, the tie-down tabs 302 are moved from a bent position to a vertical orientation in relation to the radial plane of the damper blade 110. As illustrated in FIGS. 4B to 4I, and in particular FIG. 4D, the flaps 304 of the damper seal 112 are pulled away from the radial distal section 308 of the damper blade 110 in the direction indicated by the arrow 402 to pull out the tie-down tabs 302 from the apertures 306, separating the damper seal 112 from the damper blade 110. As best illustrated in FIGS. 4F to 4I, tie-down tabs 302 are comprised of a first tie-down tab 302A facing the first side of the damper blade 110, and a second tie down tab 302B facing the second side of the damper blade 110, with the first tie-down tab 302A and the second tie-down tab 302B forming a tie-down tab pair 302, with the tie-down tab pair 302 positioned along a periphery edge 404 of the damper blade 110 for coupling a damper seal 112 with the damper blade 110. As further illustrated in the FIGS. 4F to 4I, the flaps 304 are comprised of a first flap 304A and a second flap 304B, with the first flap 304A and the second flap 304B forming a flap-pair 304 for inserting the periphery edge 404 of the damper blade 110 between the flap-pair 304.

FIGS. 5A to 5F are exemplary perspective illustrations of the damper blade in accordance with the present invention. As illustrated in FIGS. 5A to 5F, the damper mechanism 100 of the present invention is comprised of a single piece damper blade 110 (stamped from a single piece material) that has a first single continuous shaft bridge 224 at a proximate center at a first side 502 of the damper blade 110 (FIGS. 5A and 5B) and one or more second shaft bridges 202 and 204 at a distal ends of a second side 504 (FIGS. 5C and 5D) of the damper blade 110. As illustrated in FIGS. 1A to 1D, the damper mechanism 100 is rotationally mounted within the sleeve 102 by the continuous shaft 104, which is inserted through the openings of the shaft bridges. That is, the first single continuous shaft bridge 224 at the first side 502 of the damper blade 110 includes a first axial center 206 (illustrated at the second side 504) aligned parallel along a first longitudinal axis of the first continuous shaft bridge 224. The second, one or more shaft bridges 202 and 204 at the second side 504 of the damper blade 110 have common axial centers 226 and 228 (illustrated at the first side 502) that are aligned parallel along a second longitudinal axis of the second, one or more shaft bridges 202 and 204. The first axial center 206 of the first continuous shaft bridge 224 is aligned with the common axial centers 226 and 228 of the second, one or more shaft bridges 202 and 204, enabling the insertion of the continuous shaft 104 there through. The shaft bridges enable the coupling of the damper blade 110 with the continuous shaft 104 without the use of bearings, U-bolts, or any other third component, reducing the overall weight of the damper mechanism 110, which saves energy, lowering manufacturing costs, and reducing costs related to installation in terms of labor and parts. The first single continuous shaft bridge 224 has a non-limiting exemplary axial length of about 2 inches to 10 inches, a non-limiting exemplary width 520 of about 0.25 inches to 1 inch and a non-limiting exemplary depth 206 of about 0.25 inches to 0.75 inches. The one or more second shaft bridges 202 and 204 have non-limiting exemplary axial length of about 0.50 inches to 6.0 inches, non-limiting exemplary width 522 of about 0.25 inches to 0.75 inches, and non-limiting exemplary depth 226 and 228 of about 0.025 inches to 0.75 inches.

As further illustrated in FIGS. 5A to 5F, the damper blade 110 of the present invention is comprised of one or more reinforcing ridges that are positioned a distance 308 away from periphery edge 404 of the damper blade 110. The distance 308 inward enables room for the flaps 304A and 304B of the damper mechanism 112 to rest thereon. The ridges function as stiffening beads to add strength and stiffness to the damper blade 110, greater than its actual gauge. As illustrated, the reinforcing ridges are comprised of protuberances 208, 210, 212, 214, 216, and 218 on the second side 504 of the damper blade 110 and corresponding complementary recesses 230, 232, 234, 236, 238, and 240 on the first side 502 of the damper blade 110, forming embossments on the second side 504 and corresponding complementary impressions on the first side 502.

Figure 5A:
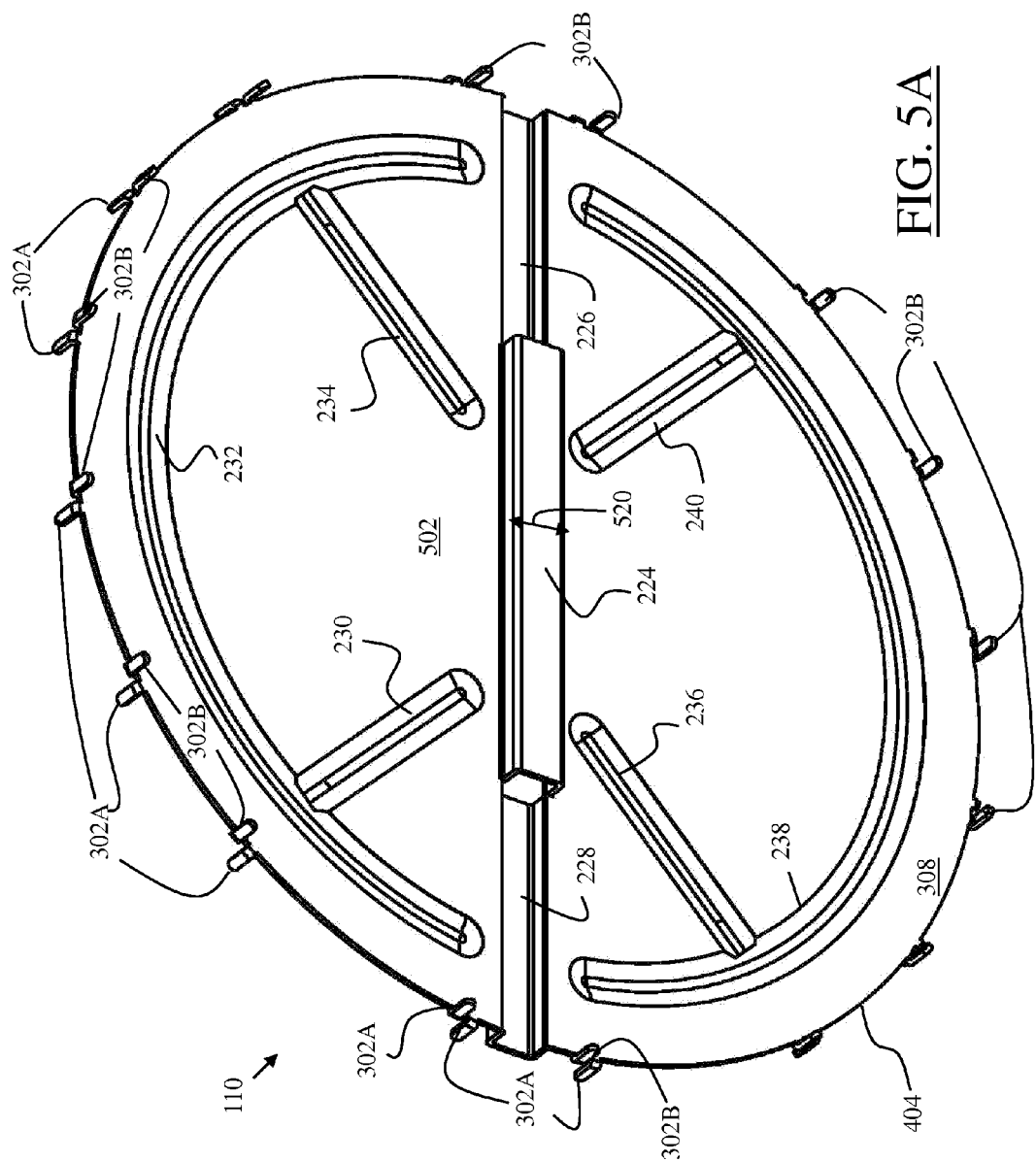
Figure 5B:
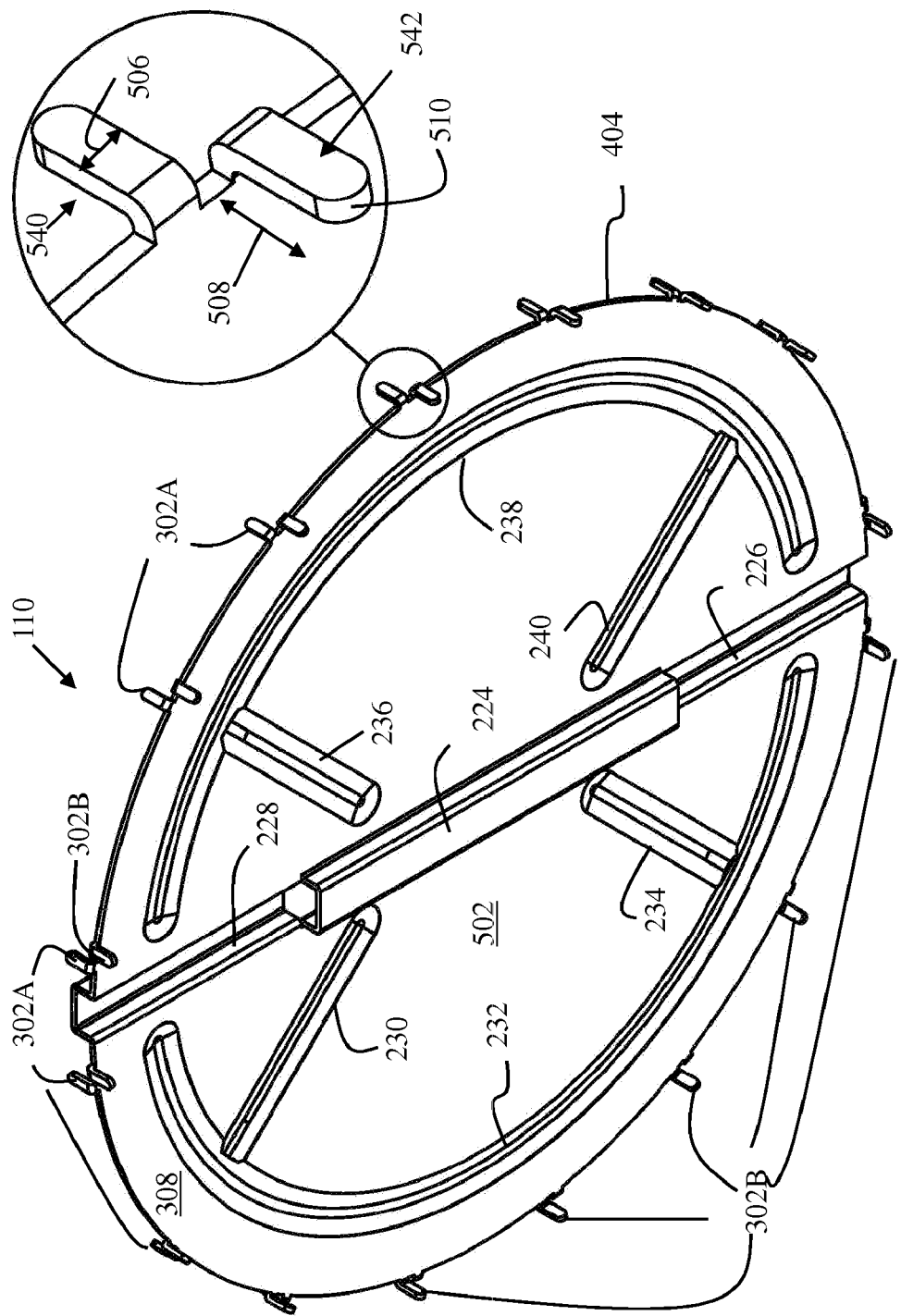
Figure 5C:
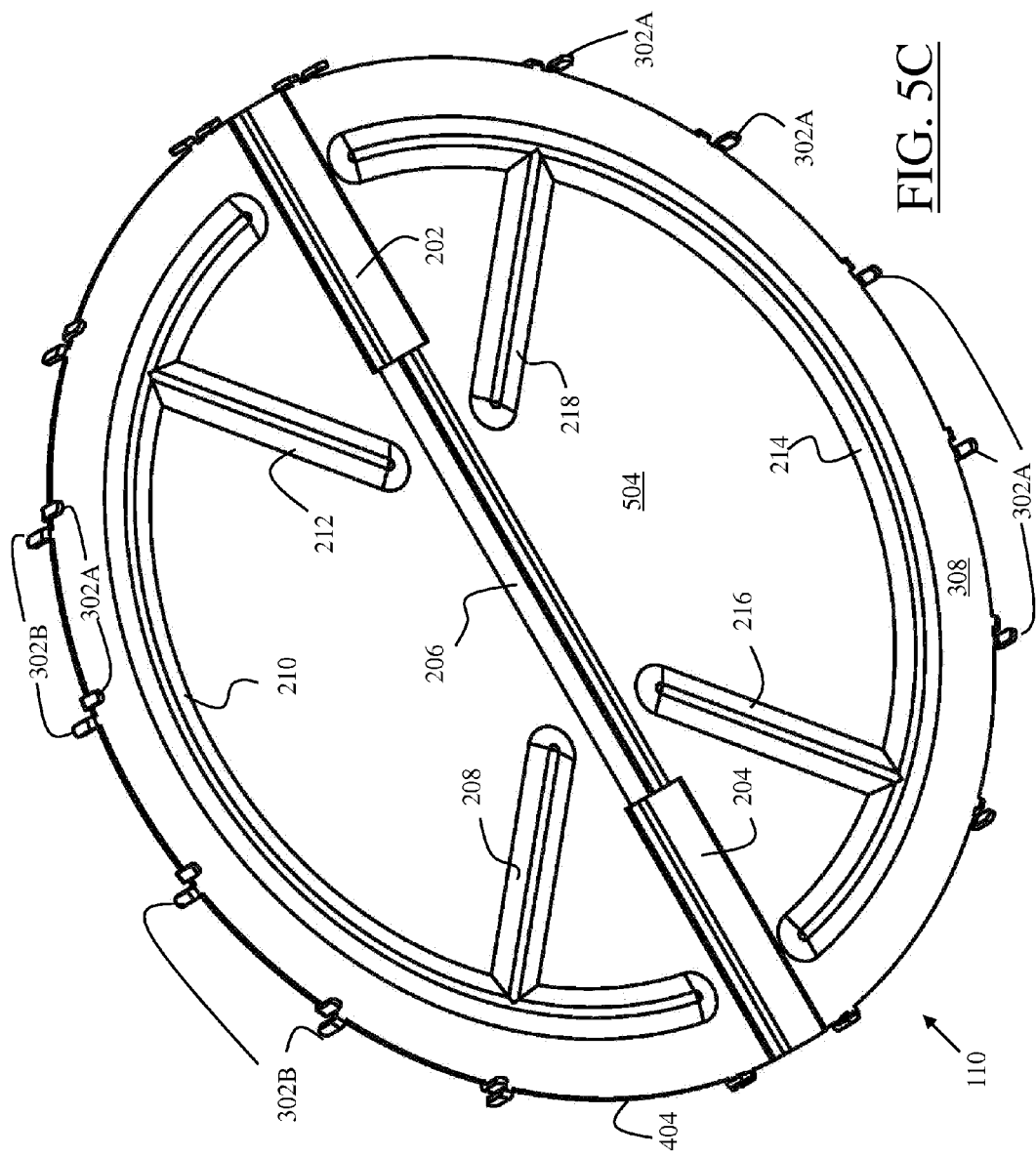
Figure 5D:
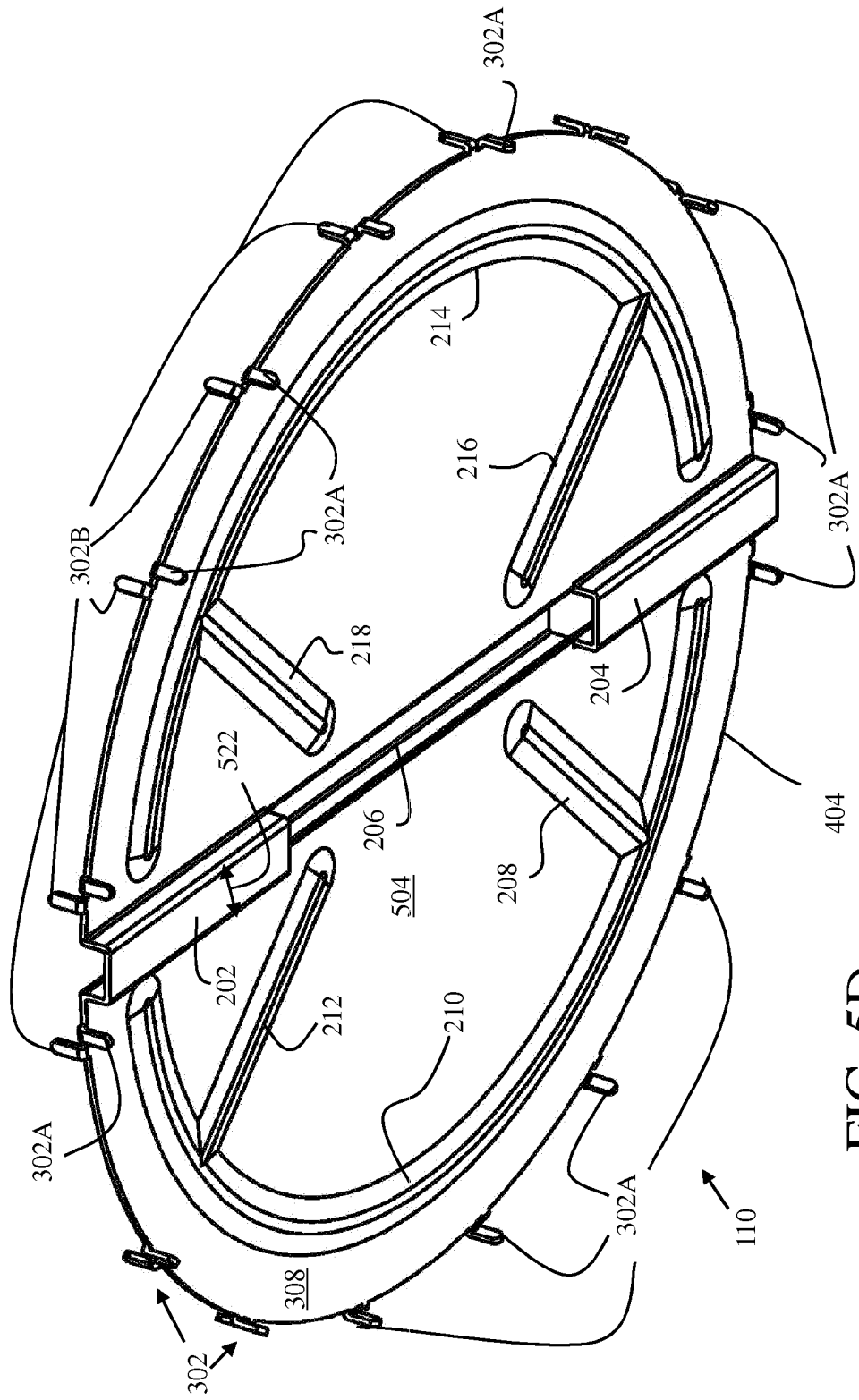
Figure 6A:
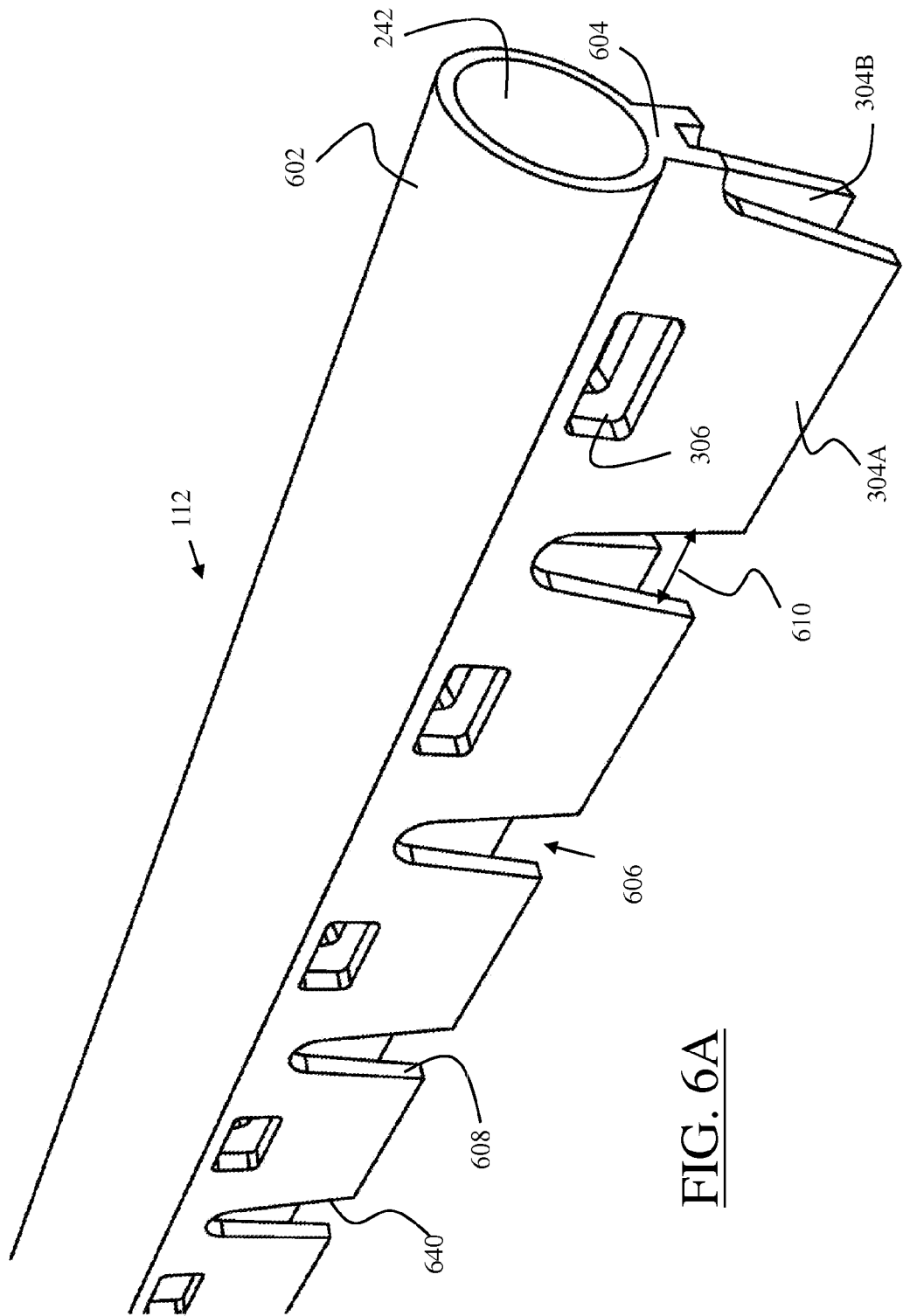
FIGS. 6A to 6D are exemplary perspective illustrations of the damper seal in accordance with the present invention.
Figure 6B:
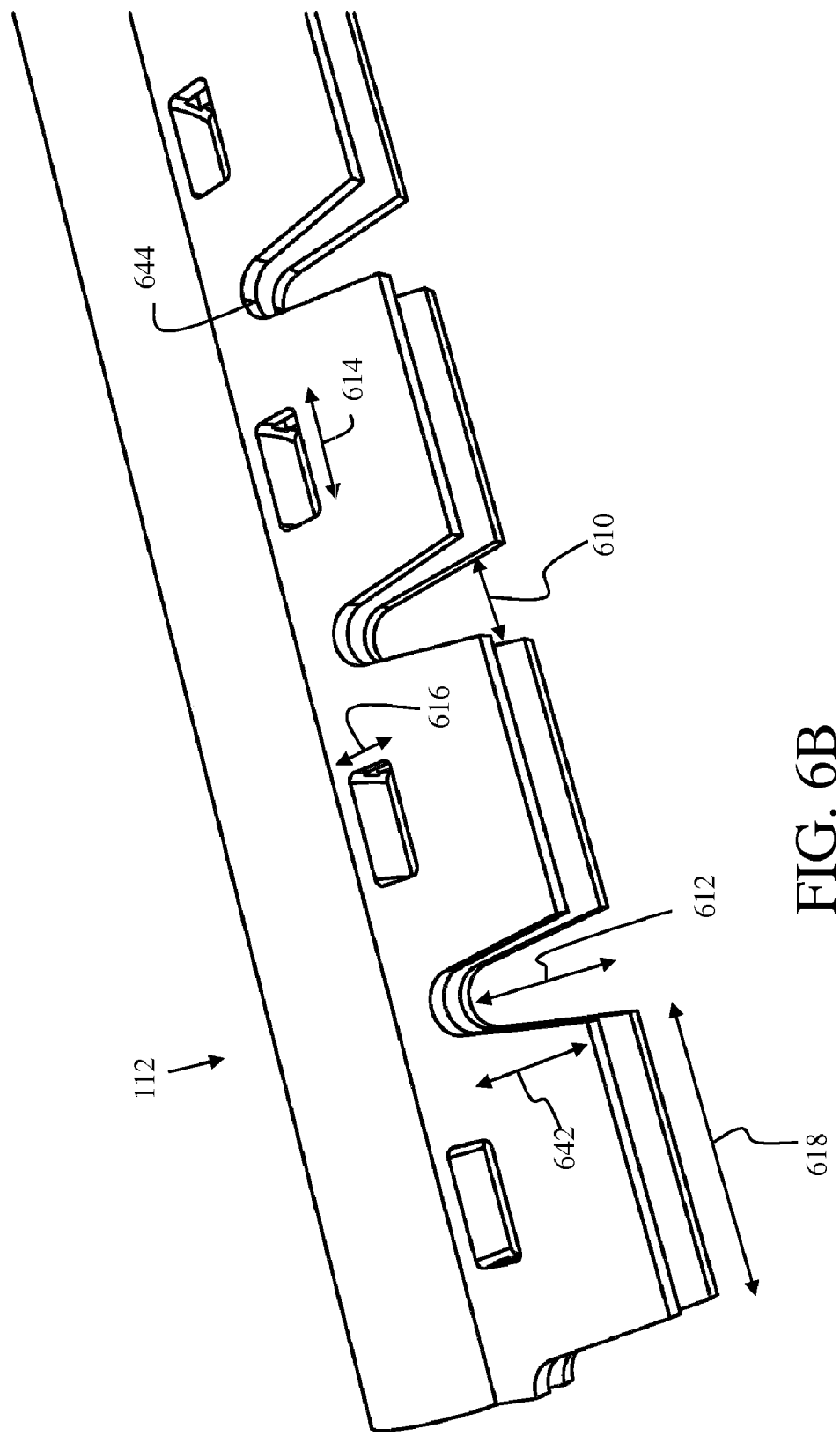
Figure 6C:
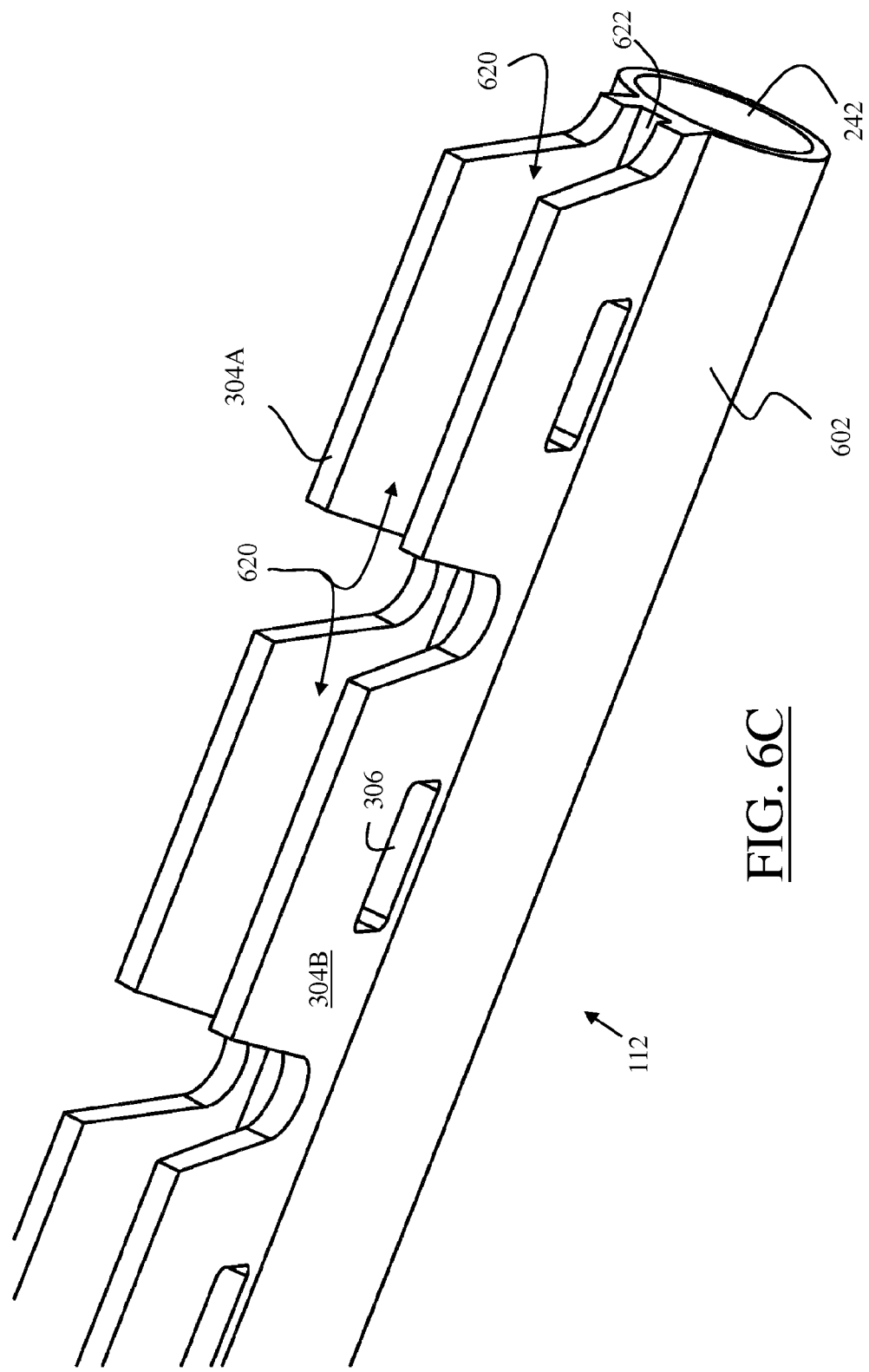
Figure 6D:
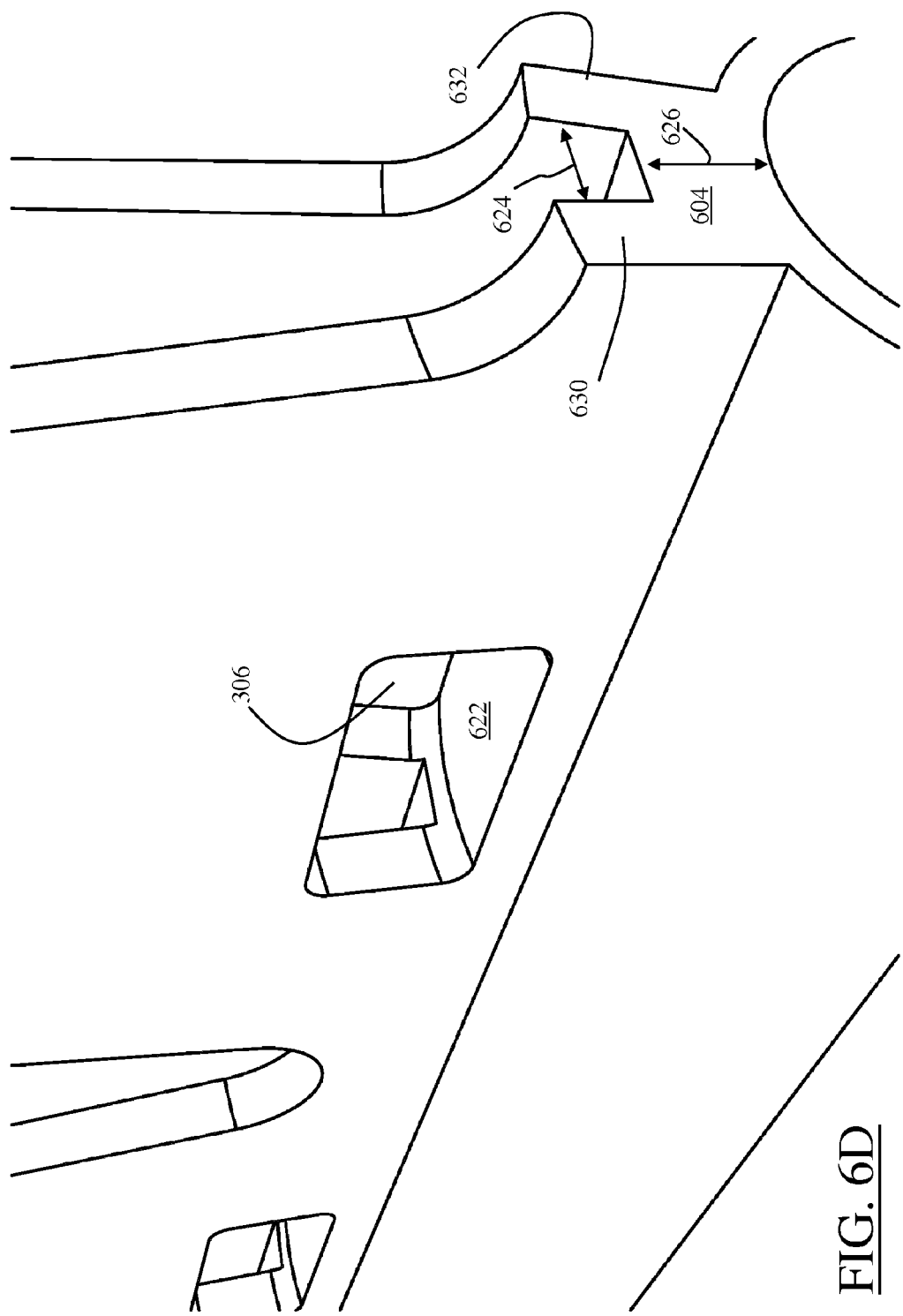
Figure 7A:
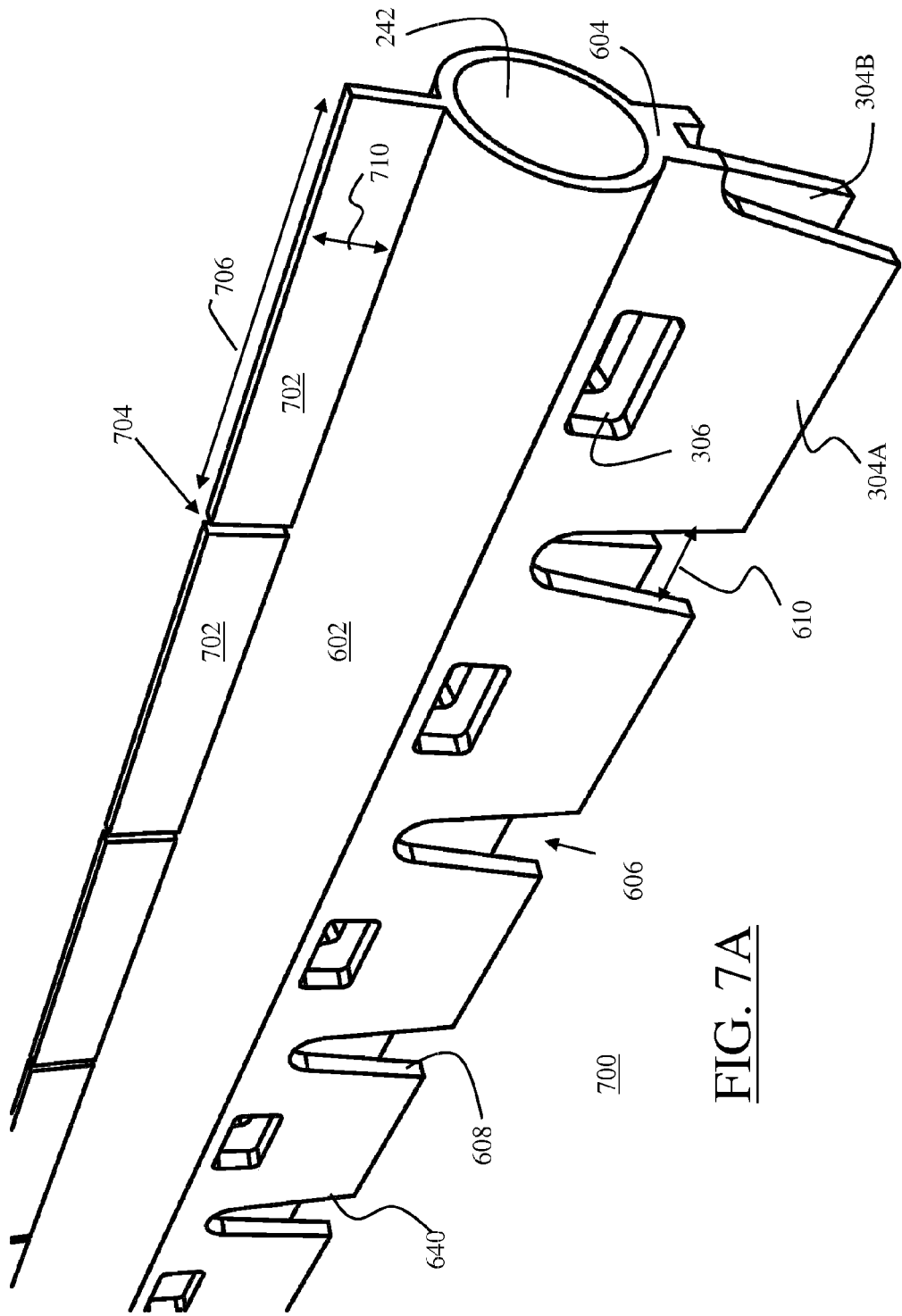
FIGS. 7A to 7D are exemplary perspective illustrations of another embodiment of a damper seal in accordance with the present invention.
Figure 7B:
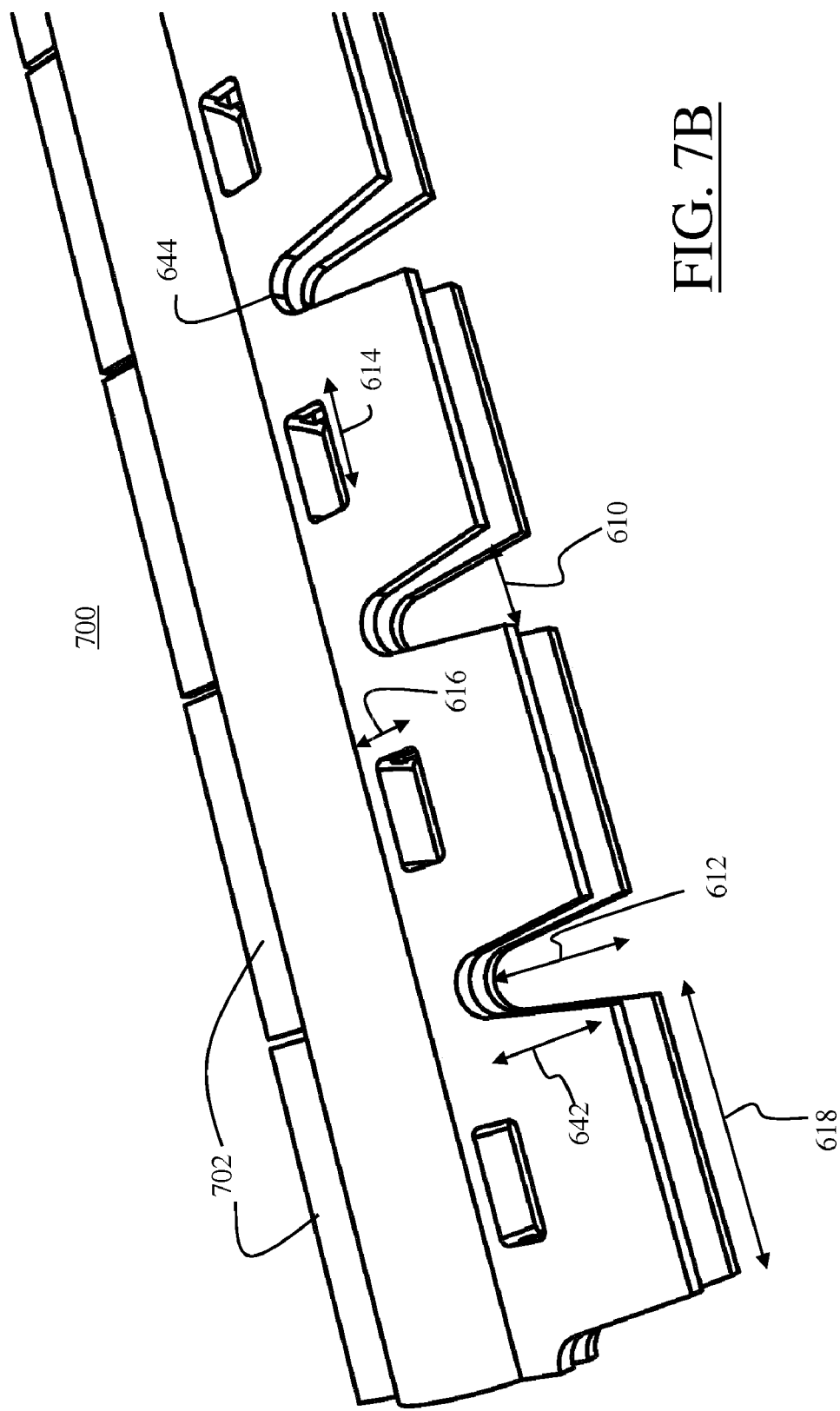
Figure 7C:
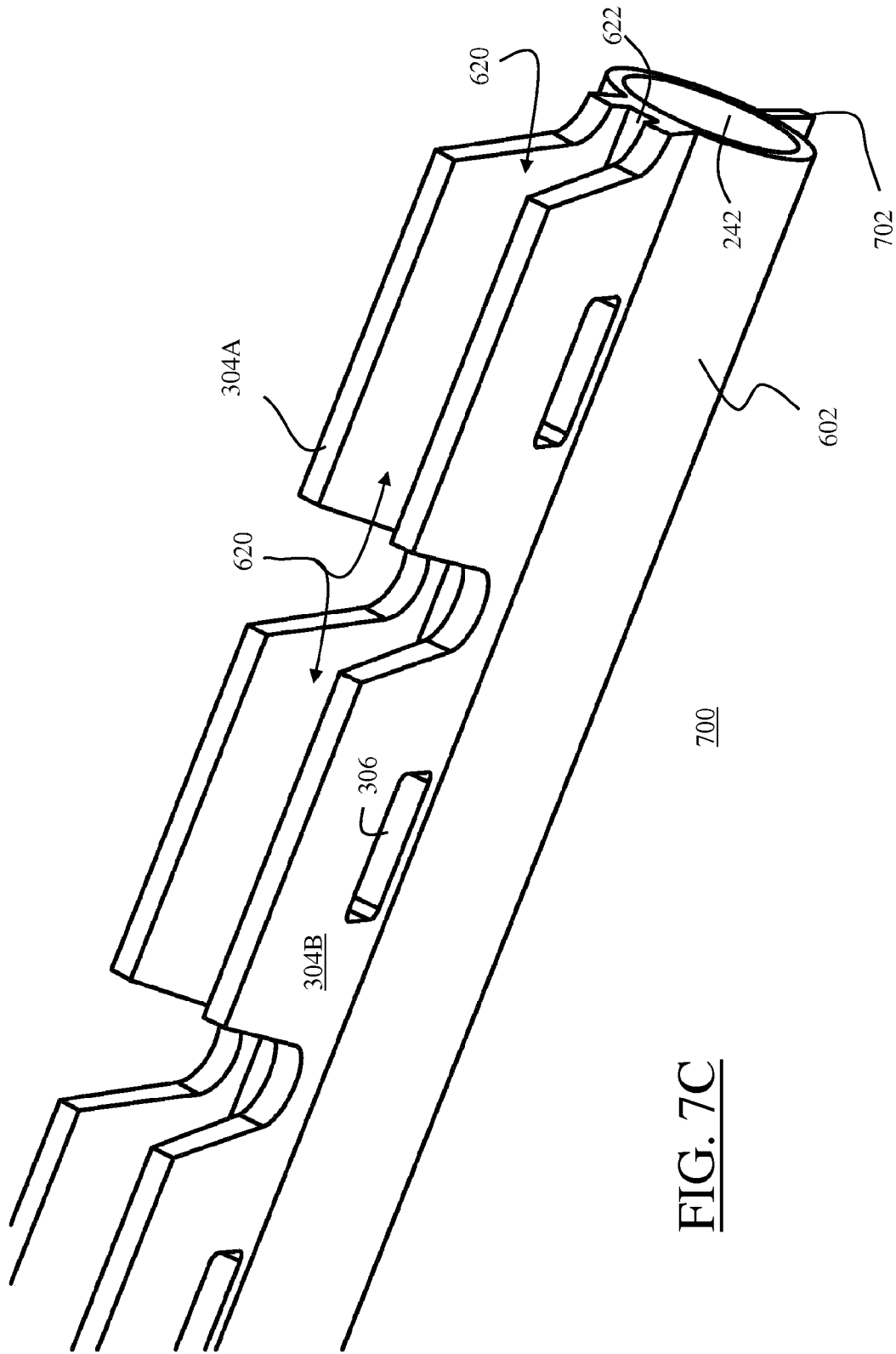
Figure 7D:
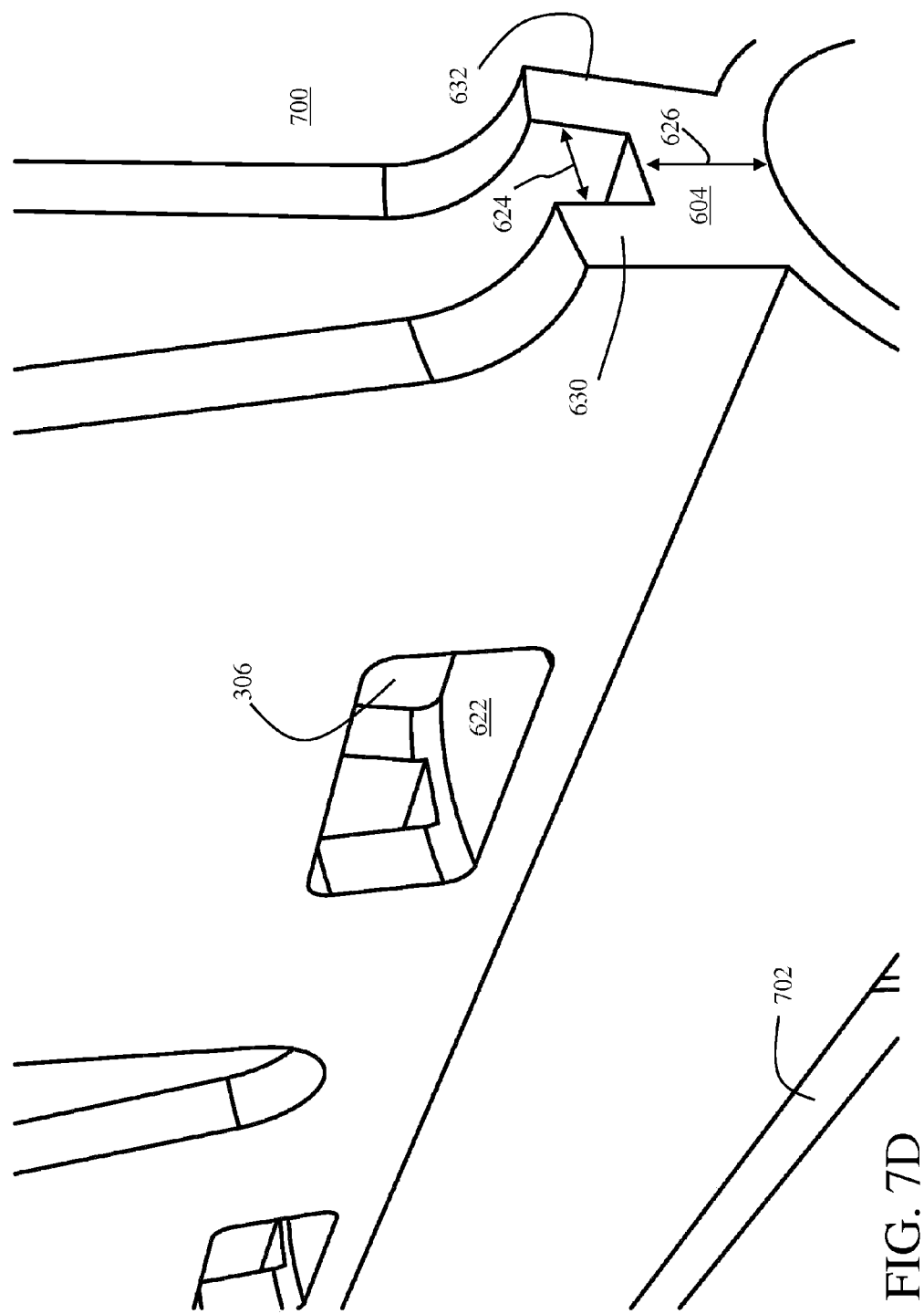

As further illustrated in FIGS. 5A to 5F, the damper blade 110 of the present invention is further comprised of a first set of tie-down tabs 302B facing the first side 502 of the damper blade 110, and a second set of tie-down tabs 302A facing the second side 504 of the damper blade 110. Combination of each of the tie-down tabs from the first set of tie-down tabs 302B and the second set of tie-down tabs 302A form a tie-down tab pair 302, with the tie-down tab pair 302 positioned along a periphery edge 404 of the damper blade 110 for coupling the damper seal 112 with the damper blade 110. As mentioned above, the tie-down tabs 302 secure the flaps 304A and 304B of the damper seal 112 onto the damper blade 110 without the use of any other material or components. As illustrated in FIG. 5B, the height 508 of about 0.15 inches to 0.35 inches, the width 506 of about 0.05 inches to 0.20 inches, and the thickness 510 of about 0.05 inches to 0.15 inches of each, individual tie-down tab 540 and 542 may vary in accordance with the environmental requirements. In other words, an individual tie-down tab (e.g., one of 540 or 542) need not be identical to any other individual tie-down tab (e.g., the other of 540 or 542), regardless of whether the individual tie-down tab is within the first or second set of tie-down tabs 302A and or 302B. For example, the individual tie-down tab 540 need not be identical to the individual tie-down tab 542, illustrated in FIG. 5D. Nonetheless, the height 508 of an individual tie-down tab is raised substantially perpendicular to the plane of the damper blade 110, its length 506 is substantially aligned along the periphery of the damper blade 110, and its thickness 510 is substantially equal to the damper blade thickness itself (if stamped from the single piece unit). The height 508 should be of sufficient size so that the tie-down tabs 302 cover sufficient area of the damper seal flaps 304 to maintain the damper seal 112 sung fit onto the damper blade 110. Hence, there is a minimum height requirement.

As further illustrated in FIG. 5E, the distances 514 of about 0.01 inches to 0.10 inches between individual tie-down tabs may vary from one pair of tie-down tabs 302 to the next, but should be smaller than the size of the apertures 306 of the damper seal 112. Accordingly, it is preferred that the distance 514 between the individual tie-down tabs be minimal, which will enable the use of smallest size aperture 306 on the damper seal 112, preventing cracking of the damper seal 112. In addition, the distances 512 (FIG. 5F) of about 0.50 inches to 5.00 inches between each pair of tie-down tab 302 may also vary, but commensurate with the length or distances between the apertures 306 on the damper seal 112. Of course, all sizes and dimensions will vary if the damper blade 110 configuration changes. For example, a rectangular or any other polygonal shaped damper blade 110 will have a different, appropriate tab settings. Therefore, the number and positions of the tab-pair are commensurate with the shape and size of the damper blade and the damper seal. In other words, the tie-down tab-pairs 302 must a have a sufficient distance to align with sufficient number of damper seal apertures 306 to enable the entire or major portion of the damper seal 112 to snug fit onto the damper blade 110. Given that the damper seal 112 is comprised of some type of polymer or resin that can be cut with easy, it is preferred that the damper seal 112 be made at a specified standardized size with sufficient number of flaps 304 and apertures 306, which can then be used with any damper blade, and if need be, the damper seal 112 can simply be cut to fit onto a desired damper blade. In other words, the damper seal can have more apertures than there are tie-down tabs on the damper blade, but the number of tie-down tabs can correspond equally to the number of apertures on the damper seal.

FIGS. 6A to 6D are exemplary perspective illustrations of the damper seal in accordance with the present invention. As illustrated, the damper seal 112 is comprised of a top 602 that extends longitudinally along an axial length of the damper seal 112, with the axial length of the damper seal 112 substantially commensurate with the length of the edge of the damper blade 110 that the damper seal would cover. The top 602 can be any configuration so long as it can maintain its shape. The top having an opening 242 that extends longitudinally along an axial length of the top 602, forms an axial opening (a through-hole). The cross-section of the top 602 and or the cross-section of the opening 242 can be of any shape, including a tubular top with a cross sections that are circular. It is preferred that the top 602 be configured as structurally small as possible so that it can support its own weight. This maintains the top 602 as close to the damper blade 110 as possible, helping the damper blade 110 support the damper seal 112. The axial opening 242 (the hole of the bull nose 602) must be small (about 0.20 inches to 0.50 inches) to avoid deformation. The benefit of an axial opening 242 is that it allows for a barometric barrier, providing a good isolation between upstream and downstream of airflow.

As further illustrated in FIGS. 6A to 6D, the damper seal 112 is further comprised of a support 604 with an exemplary height 626 of about 0.10 inches to 0.25 inches, which is protruded from the top 602, extending longitudinally along the axial length of the top 602. As illustrated, the damper seal 112 includes a first flap 304A and a second flap 304B having a first side 630 and 632 separately integral with the support 604. The first flap 304A and the second flap 304B are separated at a distance spacing 624 for forming a channel 620, with the first flap 304A and the second flap 304B forming a flap-pair 304 for inserting the periphery edge 404 of the damper blade 110 within the channel 620 between the flap-pair 304. The periphery edge 404 rests on the channel floor 622, which secures the damper seal 112 onto the damper blade 110 in a snug fit manner, preventing deformation of the damper seal 112.

As further illustrated in FIGS. 6A to 6D, the damper seal 112 is further comprised of an aperture 306 positioned along the first side 630 and 632 of the first flap 304A and the second flap 304B for insertion of the tie-down tab pair 302 for locking the damper seal 112 with the damper blade 110. The apertures 306 are generally a rectangular shape and have a length 614 parallel along the length of the first side 630 and 632 of the flap pair 304, and a width 616 normal thereto. The length 614 of the aperture is generally longer than the distance 514 between the first tie-down tab 302B and the second tie-down tab 302A.

As illustrated in FIGS. 6A to 6D, the first and the second flap 304 have a substantially trapezoid configuration with a longer base integral the support 604, a free shorter base with length 618 that is parallel with the longer base, and legs 608 and 640 that have equal length and are substantially free. The first and the second flap 304 have an altitude 642 of sufficient height that covers the distal edge 608 of the damper blade 110, on both the first 502 and the second side 504. As illustrated, the flap-pair 304 is comprised of a plurality of flap pairs that are positioned along the axial length of the support 604, with the legs 608 and 640 of one flap-pair and an adjacent flap-pair separated by a varying distance 610, forming a notch 606 in a form of a syncline with height 612. The notches 606 are used to eliminate the stress on the damper seal 112 as it is shaped to fit and be placed onto the damper blade 110. That is, the notches 606 provide room for the damper seal 112 top 606 to maintain its shape, while the rest of the damper seal body is bent to fit the damper blade, without the damper seal top cracking. In other words, it permits for flexibility of the damper seal (bending) without deforming or compromising the damper seal body. Therefore, the notches 606 are used to eliminate the wrinkles that form due to stress because of bending the damper seal to make it fit and be congruent with the damper blade configuration. The notches 606 enable the maintenance of the perfect form of the damper seal to provide a high quality sealing, and the flexibility to enable the damper seal to be congruent with the damper blade as it is placed onto the damper blade. The height 612, width 610, and the degree of separation at the vertex 644 of the syncline (the notch) 606 can vary based on the damper blade dimensions. In general, the degree of separation at the vertex 644 the syncline groove (notch) 606 must be of sufficient width to allow the adjacent edges 608 and 640 of the adjacent flaps 304 to touch each other without deforming or bending the damper seal top.

FIGS. 7A to 7D are exemplary perspective illustrations of a more preferred damper seal 700 in accordance with the present invention. The damper seal 700 includes similar corresponding or equivalent components and or interconnections as the damper seal that is shown in FIGS. 1A to 6D, and described above. Therefore, for the sake of brevity, clarity, convenience, and to avoid duplication, the general description of FIGS. 7A to 7D will not repeat every corresponding or equivalent component and or interconnections that has already been described above in relation to damper seal that is shown in FIGS. 1A to 6D.

As illustrated in FIGS. 7A to 7D, the damper seal 700 provides one or more flexible top flaps 702 juxtaposed adjacent one another and aligned along the longitudinal axis of the damper seal 700, with each top flap 702 having a length 706 parallel with the longitudinal axis of the damper seal 700, and a height 710 of about 0.10 inches to 0.25 inches. The height 710 of the top flaps 702 is of sufficient height to maintain proper seal without loosing its form-fact. In between each top flap 702 is a gap 704 that is used to eliminate the stress on the damper seal 700 as it is shaped to fit and be placed onto the damper blade 110. That is, the gaps 704 provide room for the damper seal 700 top flaps 702 to maintain their shape, while the rest of the damper seal body 700 is bent to fit the damper blade, without the damper seal top flaps 702 cracking. In other words, it permits for flexibility of the damper seal (bending) without deforming or compromising the damper seal body. Therefore, the gaps 704 are used to eliminate stress because of bending the damper seal to make it fit and be congruent with the damper blade configuration. The gaps 704 enable the maintenance of the perfect form of the damper seal 700 to provide a high quality sealing, and the flexibility to enable the damper seal 700 to be congruent with the damper blade as it is placed onto the damper blade.

The critical and advantageous reason for the use of the top flaps 702 is that it compensates for any deformities or variances that may exist in between the damper blade outer perimeter and the adjacent inner surface 114 of the sleeve 102. That is, the damper blade may be configured as has having a circular perimeter (a circumference), whereas the adjacent inner surface 114 of the sleeve 102 may not be configured as having a diameter for a perfect circular cross-section, but may have a cross-sectional distance that varies, making the cross-section of the sleeve 102, for example, egg shaped. These small variations between the shape of the damper blade and the adjacent inner surface 114 may introduce leakage and reduce the efficiency of the system. The top flaps 702 are used to compensate for such discrepancies to better seal and prevent leakage due to possible deformities in terms of mismatch between the damper blade and the inner surface 114. Therefore, regardless of the cross-sectional parameters of the damper blade or the inner cavity of the sleeve 102, the flexible top flaps 702 insure a complete seal between the two.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. For example, the first continuous shaft bridge can be on the second side of the damper blade, and the second, one or more shaft bridges on the first side. In addition, the reinforcing ridge embossments and/or impressions can be on either the first or the second side of the damper blade. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:
1. A damper mechanism, comprising:
a damper seal;
a single piece damper blade, having:
a first single continuous shaft bridge at a proximate center at a first side of the damper blade and one or more second shaft bridges at a distal ends of a second side of the damper blade;
a reinforcing ridge on at least one side of the damper blade that is positioned a distance away from periphery of the damper blade;
a first tie-down tab facing the first side of the damper blade, and a second tie down tab facing the second side of the damper blade, with the first tie-down tab and the second tie-down tab forming a tie-down tab pair, with the tie-down tab pair positioned along a periphery edge of the damper blade for coupling a damper seal with the damper blade.
2. The damper mechanism as set forth in claim 1, wherein:
the first single continuous shaft bridge at the first side of the damper blade includes a first axial center aligned parallel along a first longitudinal axis of the first continuous shaft bridge;
the second, one or more shaft bridges at the second side of the damper blade have common axial centers that are aligned parallel along a second longitudinal axis of the second, one or more shaft bridges; and
first axial center of the first continuous shaft bridge is aligned with the common axial centers of the second, one or more shaft bridges.
3. The damper mechanism as set forth in claim 1, wherein:
the reinforcing ridge is comprised of a protuberance in the first side of the damper blade and a corresponding complementary recess on the second side of the damper blade, forming an embossment on the first side and corresponding complementary impression on the second side.
4. The damper mechanism as set forth in claim 3, wherein:
the reinforcing ridge is comprised of a plurality of stiffening beads.
5. The damper mechanism as set forth in claim 1, wherein:
the tie-down tab pair is comprised of a plurality of tie-down tab pairs that are positioned along the periphery edges of the damper blade.
6. The damper mechanism as set forth in claim 1, wherein:
the first tie-down tab is a distance from the second tie down tab, forming the tie-down tab pair.
7. The damper mechanism as set forth in claim 1, wherein:
a major body portion of a damper seal body is coupled with the damper blade using the tie-down tab pair for maintaining the damper seal body congruent, consistent with damper blade first and second sides.
8. The damper mechanism as set forth in claim 7, wherein:
the damper seal is comprised of:
a top that extends longitudinally along an axial length of the damper seal;
a support protruded from the top, extending longitudinally along an axial length of the top;
a first flap and a second flap having a first side separately integral with the support and separated at a distance spacing for forming a channel, with the first flap and the second flap forming a flap-pair for inserting the periphery edge of the damper blade within the channel between the flap-pair; and
an aperture positioned along the first side of the first flap and the second flap for insertion of the tie-down tab pair for locking the damper seal with the damper blade.
9. The damper mechanism as set forth in claim 8, wherein:
The first and the second flap have a substantially trapezoid configuration with a longer base integral the protrusion;
a free shorter base that is parallel with the longer base; and
legs that have equal length and are substantially free.
10. The damper mechanism as set forth in claim 9, wherein:
the flap-pair is comprised of a plurality of flap pairs that are positioned along the axial length of the support, with the legs of one flap-pair and an adjacent flap-pair separated by a distance, forming a notch in a form of a syncline.

* * * * *